US011960296B2

(12) United States Patent
Li et al.

(10) Patent No.: US 11,960,296 B2
(45) Date of Patent: Apr. 16, 2024

(54) METHOD AND APPARATUS FOR AUTONOMOUS MOBILE DEVICE

(71) Applicant: Qfeeltech (Beijing) Co., Ltd., Beijing (CN)

(72) Inventors: Shuailing Li, Beijing (CN); Wulin Tian, Beijing (CN); Huizhong An, Beijing (CN); Xin Wu, Beijing (CN); Yiming Zhang, Beijing (CN); Zhen Chen, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 25 days.

(21) Appl. No.: 17/403,361

(22) Filed: Aug. 16, 2021

(65) Prior Publication Data

US 2022/0050462 A1    Feb. 17, 2022

(30) Foreign Application Priority Data

Aug. 17, 2020 (CN) .......................... 202010827444.8

(51) Int. Cl.
*G05D 1/00* (2006.01)
*G06T 5/70* (2024.01)

(52) U.S. Cl.
CPC ........... *G05D 1/027* (2013.01); *G05D 1/0212* (2013.01); *G05D 1/0246* (2013.01); *G06T 5/70* (2024.01)

(58) Field of Classification Search
CPC .... G05D 1/027; G05D 1/0212; G05D 1/0246; G05D 2201/0203; G05D 1/02; G06T 5/002; G06T 2207/30168; G06T 7/0002
See application file for complete search history.

(56) References Cited

U.S. PATENT DOCUMENTS

| | | | | |
|---|---|---|---|---|
| 8,873,832 B2 * | 10/2014 | Shin | .......................... | B25J 9/162 901/1 |
| 11,650,593 B2 * | 5/2023 | Sui | ....................... | G05D 1/0274 701/25 |
| 2020/0004260 A1 * | 1/2020 | Kim | ..................... | G05D 1/0246 |

FOREIGN PATENT DOCUMENTS

| CN | 111182174 A | * | 5/2020 | .......... H04N 5/2251 |
|---|---|---|---|---|
| KR | 20060081131 A | * | 7/2006 | ............. A01B 71/06 |

OTHER PUBLICATIONS

Machine Translation CN111182174 (Year: 2020).*
(Continued)

*Primary Examiner* — Anne Marie Antonucci
*Assistant Examiner* — Misa H Nguyen
(74) *Attorney, Agent, or Firm* — MILLBURN IP PLLC

(57) ABSTRACT

A method executable by an autonomous mobile device includes moving in a work environment, obtaining environmental data acquired by a sensing device, and determining whether the sensing device is in a suspected ineffective state based on the environmental data. The method also includes based on a determination that the sensing device is in the suspected ineffective state, rotating at a same location for a first predetermined spin angle. The method also includes obtaining an estimated rotation angle based on one or more motion parameters acquired by a dead reckoning sensor, comparing the estimated rotation angle with the first predetermined spin angle, and based on a determination that a difference between the estimated rotation angle and the first predetermined spin angle is greater than a first predetermined threshold value, executing escape instructions to move backwardly for a first predetermined distance and move along a curve or a folded line.

16 Claims, 17 Drawing Sheets

(56) References Cited

OTHER PUBLICATIONS

Machine Translation KR20060081131 (Year: 2006).*
News provided by SharkNinja, "New Shark IQ Robot Features Cutting-Edge Smart Navigation and Self-Empty Capability," available online at URL: https://www.prnewswire.com/news-releases/new-shark-iq-robot-features-cutting-edge-smart-navigation-and-self-empty-capability-300921862.html, published on Sep. 19, 2019, retrieved on Aug. 9, 2021 (3 pages).

* cited by examiner

METHOD AND APPARATUS FOR AUTONOMOUS MOBILE DEVICE

CROSS-REFERENCE TO RELATED APPLICATIONS

This application claims priority to Chinese Patent Application No. CN 20201082744.8, filed on Aug. 17, 2020, the content of which is incorporated herein by reference.

TECHNICAL FIELD

The present disclosure generally relates to the technical field of automatic control of autonomous mobile devices and, more specifically, to a method and apparatus for an autonomous mobile device.

BACKGROUND

Autonomous mobile devices (e.g., cleaning robots, nanny robots, etc.) have been widely implemented. However, for an autonomous mobile device equipped with a camera or a distance measuring device, because the autonomous mobile device is unable to determine whether the camera or the distance measuring device has become ineffective, the autonomous mobile device may be unable to determine whether it is moving normally, or it has been stuck in a stranded situation. Being stuck in a stranded situation means that the autonomous mobile device detects that a wheel assembly or a track chain of the autonomous mobile device is running, but due to various reasons, the autonomous mobile device is in fact not moving. The reasons may be that the autonomous mobile device has been lifted up, has been stuck with certain object, or its wheel assembly is in a slippery state. For a camera, multiple reasons may cause the camera to become ineffective. For example, the reasons may be: the camera is broken, the ambient light is too bright or too dark, the amount of feature information that can be extracted from images captured by the camera is too little, undesirable objects are attached to the camera, etc. For the distance measuring device, such as a laser-based distance measuring device, a time-of-flight ("TOF") sensor, there are also multiple reasons that can cause the distance measuring device to become ineffective. For example, interference of ambient light may cause the distance measuring device to be unable to receive the light reflected from an object, or during the operation period of the wheel assembly, the distance measuring device detects that the distance between the autonomous mobile device and an obstacle remains unchanged during a time period. When the autonomous mobile device is in a stranded situation, this situation may ultimately cause adverse effects such as exhaustion of the electric power, severe deviation between the re-constructed map and the actual map, or entry of a dead loop and being unable to complete tasks.

The currently available autonomous mobile devices that are equipped with cameras and/or distance measuring devices cannot escape from or move out of the stranded situation when it is undetermined whether the camera or the distance measuring device is ineffective. Method or apparatus for assisting the autonomous mobile device in escaping from (or moving out of) the stranded situation may be referred to as an escape method or escape apparatus, for the convenience of description.

With respect to the above issues, no effective solution has been proposed in existing technology.

SUMMARY OF THE DISCLOSURE

Embodiments of the present disclosure provide an escape method executable by an autonomous mobile device and an apparatus configured to implement the escape method. The escape method and apparatus disclosed herein resolve the technical issues associated with the existing autonomous mobile device, i.e., the existing autonomous mobile device equipped with a camera or a distance measuring device cannot escape from the stranded situation when it is undetermined whether the camera or the distance measuring device is ineffective.

According to an aspect of the present disclosure, an escape method executable by an autonomous mobile device is provided. The method includes: moving in a work environment and obtaining environmental data acquired by a sensing device included in the autonomous mobile device; determining, based on the environmental data, whether the sensing device is in a suspected ineffective state. The suspected ineffective state refers to as a state in which the autonomous mobile device is unable to determine whether it is in a stranded situation based on feedback information provided by the sensing device. The method also includes: based on a determination that the sensing device is in the suspected ineffective state, rotating at a same location (i.e., spinning around a central vertical axis of the autonomous mobile device itself) for a first predetermined spin angle. The spinning may be caused by controlling two wheels (left and right wheels) of a wheel assembly to rotate in the same speed but in opposite directions. The method also includes: obtaining an estimated rotation angle of the autonomous mobile device based on one or more motion parameters acquired by a dead reckoning sensor, and comparing the estimated rotation angle with the first predetermined spin angle. The one or more motion parameters may include at least one of an angular velocity, an angle, and/or an angular acceleration, a moving displacement of each wheel, or a distance between the left and right wheels. The method also includes: based on a determination that a difference (which may be an absolute value) between the estimated rotation angle and the first predetermined spin angle is greater than a first predetermined threshold value, executing escape instructions. The escape instructions, when executed by the autonomous mobile device, cause the autonomous mobile device to perform the following functions or operations: moving backwardly for a first predetermined distance; and moving along a curve, or a folded line, to circumvent a location where the autonomous mobile device detects (or determines) that the sensing device is in the suspected ineffective state (hereinafter "a stranded location").

In some embodiments, the sensing device includes an image capturing device. Obtaining the environmental data acquired by the sensing device of the autonomous mobile device includes: obtaining images of the work environment acquired by the image capturing device.

In some embodiments, the sensing device includes a distance measuring device. Obtaining the environmental data acquired by the sensing device of the autonomous mobile device includes: obtaining distance information acquired by the distance measuring device. The distance information includes a distance between the autonomous mobile device and an object in the work environment (including, for example, an obstacle).

In some embodiments, determining whether the sensing device is in the suspected ineffective state based on the environmental data includes at least one of: based on a determination that a quantity (or number) of image features extracted from the acquired images is smaller than a predetermined number, and/or, an unqualified image ratio is greater than a predetermined unqualified image ratio, determining that the image capturing device is in the suspected ineffective state; after the acquired images are processed to remove noise, based on a determination that in a same image, an image contrast ratio between the brightest pixel and the darkest pixel is lower than a predetermined contrast ratio, determining that the image capturing device is in the suspected ineffective state; when a same image feature is extracted from multiple captured images, and the multiple captured images are arranged in a chronological order according to the time instances at which the images are captured to form an image sequence, and based on a determination that a moving path of the same image feature extracted from the image sequence does not match with a motion state estimated based on one or more motion parameters acquired by or relating to a dead reckoning sensor and/or a motion unit of the autonomous mobile device, determining that the image capturing device is in the suspected ineffective state.

In some embodiments, determining whether the sensing device is in the suspected ineffective state based on the environmental data includes at least one of: based on a determination that data provided by the dead reckoning sensor of the autonomous mobile device indicate that the wheel assembly of the autonomous mobile device is operating (e.g., rotating) normally, but that the distance information acquired by the distance measuring device has not changed (i.e., has remained the same or unchanged) within a first predetermined duration, or, the change in the distance information is within a predetermined threshold range, determining that the distance measuring device is in a suspected ineffective state; based on a determination that the sensing device does not receive a recognizable light within a second predetermined duration, determining that the distance measuring device is in a suspected ineffective state.

In some embodiments, the method also includes: after determining that the sensing device is in a suspected ineffective state, determining a continuous time duration in which the sensing device is in the suspected ineffective state, and comparing the continuous time duration relating to the suspected ineffective state with a third predetermined time duration; based on a determination that the continuous time duration in which the sensing device is in the suspected ineffective state exceeds the third predetermined time duration, and a difference (which may be an absolute value) between the estimated rotation angle and the first predetermined spin angle is greater than the first predetermined threshold value, executing escape instructions.

In some embodiments, moving along a curve includes: step S1, controlling the wheel assembly to drive the autonomous mobile device to move forwardly while rotating in a second rotation direction for a first predetermined rotation angle. In some embodiments, the wheel assembly may include at least two wheels distributed on the left and right sides of the autonomous mobile device. The left and right wheels may be independently controlled by two motors. When the rotation speeds (i.e., angular velocities) of the two wheels are controlled to be the same and the rotation directions are the same, the autonomous mobile device may move linearly. When the rotation speeds are different and the rotation directions are the same, or when one rotation speed is zero and the other rotation speed is non-zero, the autonomous mobile device may move linearly while rotating in a predetermined rotation direction, generating a curve moving path. When the rotation speeds are the same and the rotation directions are opposite, the autonomous mobile device may rotate at the same location around a central vertical axis of itself (i.e., spin at the same location) without performing a linear movement. Step S2, based on a determination that the autonomous mobile device has rotated for the first predetermined rotation angle, determining a current location of the autonomous mobile device. Step S3, comparing the current location of the autonomous mobile device determined in the step S2 with a stranded location; based on a determination that at the current location determined in the step S2 the autonomous mobile device circumvents the stranded location, performing a normal movement; otherwise, executing steps S1 or S4. At the current location the autonomous mobile device is deemed to circumvent the stranded location when the current location is away from the stranded location, and the autonomous mobile device at the current location is not in a stranded situation. In some embodiments, the coordinates of the current location may be compared with the coordinates of the stranded location to determine whether at the current location the autonomous mobile device circumvents the stranded location. For example, in some embodiments, when the current location is away from the stranded location for a predetermined distance, it may be determined that at the current location the autonomous mobile device circumvents the stranded location. In some embodiments, any method disclosed herein for performing a determination of whether the autonomous mobile device is in a stranded situation may be performed at the current location to determine if the autonomous mobile device is in the stranded situation. Step S4, controlling the wheel assembly to drive the autonomous mobile device to move forwardly while rotating in a first rotation direction for a second predetermined rotation angle. Step S5, based on a determination that the autonomous mobile device has rotated for the second predetermined rotation angle, determining a current location of the autonomous mobile device. Step S6, comparing the current location of the autonomous mobile device determined in the step S5 with the stranded location; based on a determination that at the current location determined in the step S5 the autonomous mobile device circumvents the stranded location, performing a normal movement; otherwise, repeating the execution of steps S1-S3 or steps S4-S6, until the at the current location determined in the step S5 the autonomous mobile device circumvents the stranded location. The first rotation direction and the second rotation direction may be the same or different (e.g., opposite). The first predetermined rotation angle and the second predetermined rotation angle may be the same or are different.

A normal movement includes at least one of the following movements: a coverage mode, an edge following mode, or a navigation mode. The coverage mode is a mode in which the autonomous mobile device covers the floor or ground in the work area in a corn-row manner to have a high coverage. The edge following mode is a mode in which the autonomous mobile device moves along the edge(s) of an object on a side of the object. The navigation monde is a mode in which the autonomous mobile device starts from the current coordinate position and moves directly to a target coordinate position in a certain route.

In some embodiments, after the autonomous mobile device has moved backwardly for the first predetermined distance, the method also includes: Step S0, using a current heading direction after the autonomous mobile device has moved backwardly for the first predetermined distance as an initial direction, rotating at the same location (i.e., spinning around a central vertical axis of the autonomous mobile device itself) in the first rotation direction for the second predetermined spin angle. The current heading direction is a direction in which a pre-defined head (or front) portion of the autonomous mobile device is heading. For illustrative purposes, an arrow 211 shown in FIG. 2A indicates a heading direction.

In some embodiments, moving along a curve includes: using a second predetermined distance as a radius and a predetermined location as a center, determining a target trajectory arc. The predetermined location is located in a zone in front of the stranded location. Moving along the curve also includes: moving along the target trajectory arc for a third predetermined distance, or moving long the target trajectory arc for a tangent chord angle that is equal to a second predetermined angle.

In some embodiments, moving along a folded line includes: Step S1', rotating at the same location in the first rotation direction for a third predetermined spin angle. Step S2', moving linearly from the current location in the current heading direction for a first target distance. Step S3', based on a determination that the autonomous mobile device has moved for a first target distance, determining the current location of the autonomous mobile device. Step S4', comparing the current location of the autonomous mobile device determined in the step S4' with the stranded location; based on a determination that at the current location determined in the step S4' the autonomous mobile device circumvents the stranded location, performing a normal movement; otherwise, executing steps S1' or S5'. Step S5', rotating at the same location in a second rotation direction for a fourth predetermined spin angle. Step S6', moving linearly from the current location (the location after the step S5' is performed) in the current heading direction for a second target distance. Step S7', comparing the current location with the stranded location; based on a determination that at the current location (the location after the step S6' is performed) the autonomous mobile device circumvents the stranded location, performing a normal movement; otherwise, repeating the execution of steps S1'-S4', or steps S5'-S7', until at the current location (the location after the step S6' is performed) the autonomous mobile device circumvents the stranded location. The first rotation direction and the second rotation direction may be the same or different (e.g., opposite). The third predetermined spin angle and the fourth predetermined spin angle may be the same or different. The first target distance and the second target distance may be the same or different.

According to another aspect of the embodiments of the present disclosure, an escape apparatus (also referred to as a control apparatus) for the autonomous mobile device is provided. Note that the escape apparatus or the control apparatus is a part of the autonomous mobile device. The apparatus includes: a motion unit configured to drive the autonomous mobile device to move in a work environment; a determination module configured to obtain environmental data acquired by the sensing device of the autonomous mobile device, and determine, based on the environmental data, whether the sensing device is in a suspected ineffective state. The suspected ineffective state refers to a state in which the autonomous mobile device is unable to determine whether it is in a stranded situation based on feedback information provided by the sensing device. The apparatus also includes a first control module configured to control the autonomous mobile device to rotate at the same location (i.e., spin around a central vertical axis of itself) for a first predetermined spin angle, based on a determination that the sensing device is in the suspected ineffective state. The apparatus also includes a second control module configured to obtain an estimated rotation angle of the autonomous mobile device based on one or more motion parameters acquired by a dead reckoning sensor, compare the estimated rotation angle with the first predetermined spin angle, and execute escape instructions based on a determination that a difference (which may be an absolute value) between the estimated rotation angle and the first predetermined spin angle is greater than a first predetermined threshold value. The escape instructions, when executed, may cause the autonomous mobile device to perform the following functions or operations: moving backwardly for a first predetermined distance; and moving along a curve, or a folded line, to circumvent the stranded location. In some embodiments, moving backwardly for the first predetermined distance includes: starting from the stranded location, moving backwardly for the first predetermined distance to a new initial location. In some embodiments, moving along the curve or the folded line may include: starting from the new initial location, moving along the curve or the folded line to circumvent the stranded location.

According to another aspect of the embodiments of the present disclosure, a non-transitory computer-readable storage medium is provided. The storage medium stores a program. When the program is executed, the apparatus in which the storage medium is mounted, loaded, or otherwise electronically or mechanically coupled, is controlled to perform the above escape method.

According to another aspect of the embodiments of the present disclosure, a processor is provided. The processor is configured to execute the program. When the program is executed by the processor, the above escape method is performed.

In some embodiments of the present disclosure, an escape method executable by an autonomous mobile device is provided. The method includes: moving in a work environment; obtaining environmental data acquired by the sensing device, and determining whether the sensing device is in a suspected ineffective state based on the environmental data. The suspected ineffective state refers to a state in which the autonomous mobile device is unable to determine whether it is in a stranded situation based on the feedback information provided by the sensing device. The method also includes, based on a determination that the sensing device is in the suspected ineffective state, rotating at the same location (i.e., spinning around a central vertical axis of the autonomous mobile device itself) for a first predetermined spin angle. The method also includes obtaining an estimated rotation angle based on one or more motion parameters acquired by a dead reckoning sensor, and comparing the estimated rotation angle with the first predetermined spin angle. The method also includes, based on a determination that a difference (which may be an absolute value) between the estimated rotation angle and the first predetermined spin angle is greater than a first predetermined threshold value, executing the escape instructions. The escape instructions, when executed, may cause the autonomous mobile device to perform the following functions or operations: moving backwardly for a first predetermined distance; and moving along a curve, or a folded line, to circumvent the stranded location. By obtaining the environmental data acquired by the sensing device of the autonomous mobile device, and determining whether the sensing device is in the suspected ineffective state based on the environmental data, the autonomous mobile device can determine whether it is in a stranded situation based on a determination that the sensing device is in the suspected ineffective state. Based on a determination that the autonomous mobile device is in a stranded situation, the autonomous mobile device executes the corresponding escape instructions for escaping the stranded situation. As a result, the autonomous mobile device can detect, in real time, whether the sensing device is in the suspected ineffective state, and can adjust, in time, the operation state (e.g., the moving path and/or direction) of the autonomous mobile device, such that the autonomous mobile device can move out of the stranded situation. Accordingly, the technical issues associated with the conventional autonomous mobile device equipped with the camera and/or the distance measuring device can be resolved, i.e., the autonomous mobile device being unable to escape from the stranded situation when it is undetermined whether the camera or the distance measuring device is in an ineffective state can be resolved.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The accompanying drawings are provided to illustrate some, but not all, embodiments of the present disclosure to facilitate the understanding of the present disclosure. The drawings are parts of the present disclosure. The illustrative embodiments and the descriptions are for explaining the principles of the present disclosure, and are not intended to limit the scope of the present disclosure. In the drawings.

DETAILED DESCRIPTION

Figure 1A:
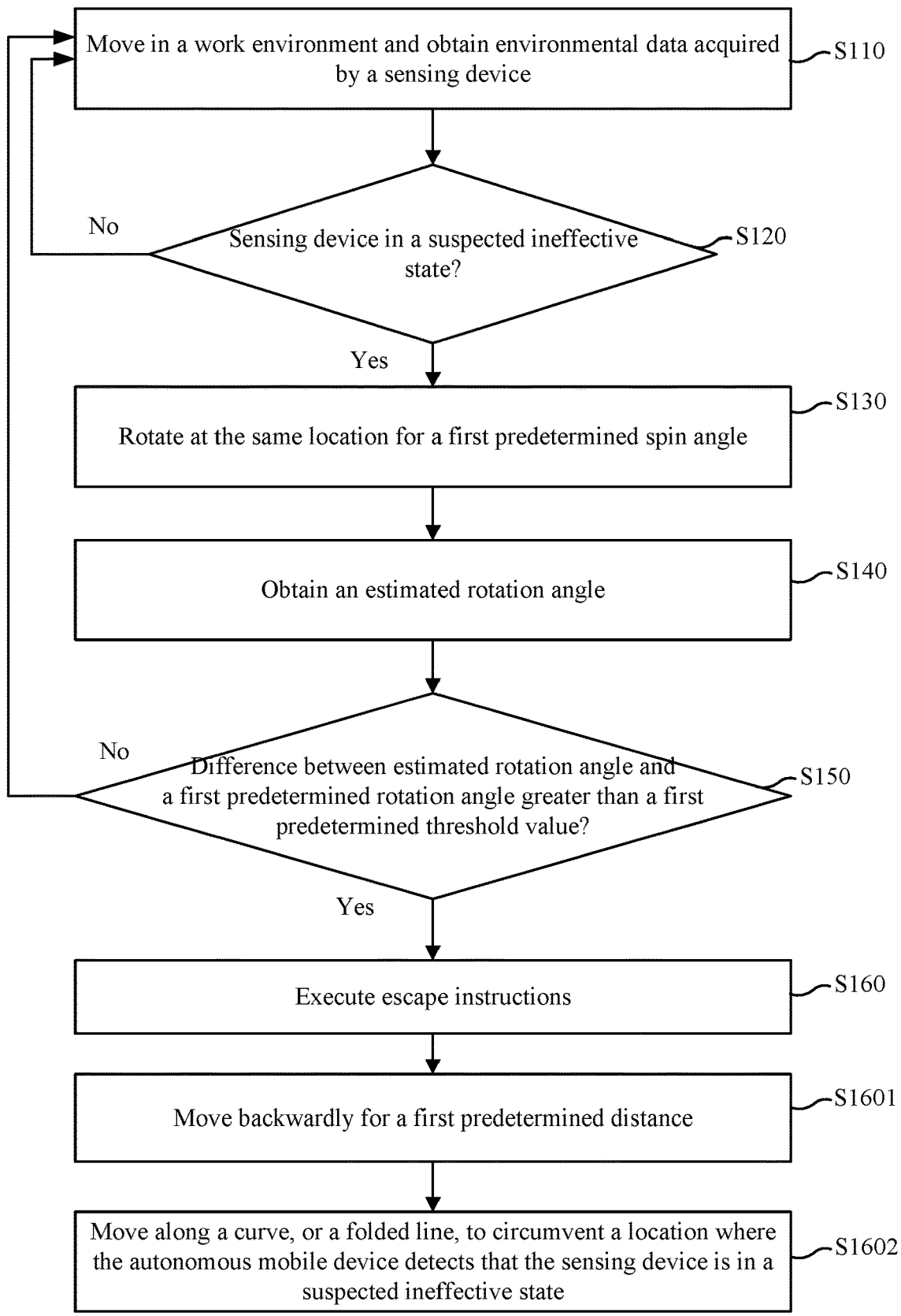
FIG. 1A is a flowchart illustrating an escape method executable by an autonomous mobile device, according to an embodiment of the present disclosure.

To assist a person having ordinary skills in the art in understanding the technical solutions of the present disclosure, the technical solutions of various embodiments of the present disclosure will be explained in detail, with reference to the accompanying drawings. The embodiments illustrated in the drawings and described below are merely some, but not all, embodiments of the present disclosure. Based on the illustrated embodiments, a person having ordinary skills in the art can derive other embodiments without creative efforts. The derived embodiments are also within the scope of protection of the present disclosure.

It should be understood that in the specification, claims, and drawings of the present disclosure, relational terms such as "first" and "second," etc., are only used to distinguish similar objects, and do not necessarily describe a specific order or sequence. It should be understood that data modified by such terms may be exchanged in suitable situations, such that the embodiments described herein can be implemented in orders or sequences other than those described or illustrated herein. In addition, the term "comprise," "include," and their variations are intended to mean non-exclusive inclusion. For example, processes, methods, systems, products, or devices (or apparatus) including a series of steps or units are not limited to the listed steps or units, and may also include other steps or units that are not explicitly listed or that are inherent to the processes, methods, products, or devices.

In some embodiments, the present disclosure provides an escape method executable by an autonomous mobile device. Computer-executable instructions corresponding to the steps shown in the flowcharts in the drawings may be executed by a processor. Although a logic sequence may be included in the steps shown in the flowchart, under certain circumstances, the steps illustrated or described may be executed in other orders or sequences.

FIG. 1A is a flowchart illustrating an escape method executable by an autonomous mobile device, according to an embodiment of the present disclosure. As shown in FIG. 1A, the method may include the following steps:

Step S110, moving in a work environment, and obtaining environmental data acquired by a sensing device of the autonomous mobile device.

The autonomous mobile device may be a cleaning robot (e.g., a smart floor sweeping machine, a smart floor mopping machine, a window cleaning robot), an accompany type mobile robot (e.g., a smart electronic pet, a nanny robot), a service type mobile robot (e.g., a reception robot for a hotel, a restaurant, a meeting place), an industrial inspection smart device (e.g., an electric power inspection robot, a smart forklift, etc.), a security robot (e.g., a home or commercial smart guard robot). The autonomous mobile device may be other type of mobile robot that can move two-dimensionally using a driving unit such as a wheel assembly or a track chain. It is noted that for simplicity of discussion, a wheel assembly is used as an example driving unit in the descriptions of the present disclosure. It is understood that the wheel assembly may be replaced by the track chain or any other suitable driving unit.

The term "sensing device" refers to a sensor or device configured to detect or measure image information or distance information relating to the environment in which the autonomous mobile device moves. The sensing device carried by the autonomous mobile device may be: an image capturing device (e.g., a camera), and/or a distance measuring device. The distance measuring device may be, e.g., a light detection and ranging ("Lidar") sensor, a time of flight ("TOF") sensor, an ultrasonic distance measuring device, or a depth camera (or sensor). For different sensing devices, the methods for determining whether the sensing device is in a suspected ineffective state may be different. The suspected ineffective state refers to a state in which the feedback information provided by the sensing device is insufficient for the autonomous mobile device to determine whether it is in a stranded situation. The feedback information may include any data acquired by the sensing device. Detailed methods of determining whether the sensing device is in the suspected ineffective state will be described below.

According to an embodiment of the present disclosure, when executing step S110, a control unit (or controller, processor) included in the autonomous mobile device may obtain the environmental data acquired by the sensing device. For example, the sensing device may transmit the acquired environmental data to the control unit. Alternatively, in some embodiments, the environmental data may be remotely obtained by a computer/server/central processing unit ("CPU"), such as, a field-programmable gate array ("FPGA"), a digital signal processor ("DSP"), etc., which is connected with the autonomous mobile device through a network/Bluetooth. In some embodiments, data processing and analysis may be performed by a remote server, such as a cloud computer, and the remote server may transmit detailed instructions determined based on the data processing results to the autonomous mobile device, such that the autonomous mobile device may perform various operations, movements, etc. In the following descriptions of the embodiments, the data processing and analysis are presumed to be performed by the autonomous mobile device.

During the movement of the autonomous mobile device, the environmental data acquired by the sensing device of the autonomous mobile device may be obtained according to a predetermined frequency (e.g., 20 Hz), or a predetermined time interval (e.g., every 50 ms), or when a triggering condition is satisfied. The triggering condition may be, for example: when encoders of the autonomous mobile device detect that two wheels of a wheel assembly have different displacements, or the encoders detect, or the gyroscope discovers, through computation that the velocity and/or angle of the autonomous mobile device has changed.

Step S120, determining whether the sensing device is in the suspected ineffective state based on the environmental data acquired by the sensing device. Based on a determination that the sensing device is in the suspected ineffective state, the autonomous mobile device may execute step S130; otherwise, the autonomous mobile device may execute step S110.

The autonomous mobile device may include various sensors. During a movement, when there is an obstacle near the autonomous mobile device, a processor of the autonomous mobile device usually receives notification information from one or more sensors about the obstacle. For example, if the autonomous mobile device collides with an obstacle while moving forwardly, a collision sensor located at the front portion of the autonomous mobile device may be triggered, which may transmit information indicating the collision to the processor of the autonomous mobile device. If a steep downward cliff (e.g., downward stairs) appears in front of the autonomous mobile device, a cliff sensor mounted at the front lower portion for detecting an abrupt drop of the floor (e.g., an infrared diode or a TOF sensor) may detect the steep cliff at the floor, and may generate and transmit an alert signal to the processor of the autonomous mobile device. If there is an obstacle within a predetermined distance from a side of the autonomous mobile device, a proximity sensor mounted at the side of the autonomous mobile device (e.g., an infrared diode or a TOF sensor) may detect the obstacle. If the autonomous mobile device is lifted up such that the wheel assembly is above the floor, a wheel drop sensor mounted on the wheel assembly may sense that the autonomous mobile device has been lifted up and may transmit information indicating the lift to the processor of the autonomous mobile device. Because the type and number of sensors on the autonomous mobile device are limited, under some circumstances, certain obstacles or obstacle-type spaces may not be detected. When obstacles or obstacle-type spaces are not detected by the above commonly used sensors (e.g., the collision sensor, proximity sensor, cliff sensor, wheel drop sensor, etc.), the undetected obstacles or obstacle-type spaces may affect the movement of the autonomous mobile device. The above-described situations may be collectively referred to as a "stranded situation."

On one hand, when the autonomous mobile device is in the stranded situation, in conventional technology, the processor of the autonomous mobile device does not receive the notification information from the pertinent sensors. So, the autonomous mobile device continues to attempt to move in a normal mode, even though the autonomous mobile device is already in the stranded situation. Ultimately, this may result in the exhaustion of the electric power, severe deviation between the re-constructed map and the actual map, or entry of a dead loop, such that the autonomous mobile device cannot accomplish a predetermined task. In conventional technology, the autonomous mobile device may not be able to move out of the stranded situation due to the limitations on the performance of the sensors. For example, for an autonomous mobile device equipped with an image capturing device (e.g., a camera) as a sensing device, the autonomous mobile device may obtain images using the camera, and may extract feature information from the images. The autonomous mobile device may perform localization and mapping through Visual Simultaneous Localization and Mapping ("VSLAM") based on the feature information and one or more motion parameters such as mileage provided by odometers of the encoders, angular velocity and angle provided by a gyroscope, acceleration provided by an accelerometer, and linear velocity provided by the encoders. If the autonomous mobile device moves to a dark space under a bed, the autonomous mobile device cannot determine its location through the camera. In some situations, although the camera may be malfunctioning, the camera can still provide images. However, the images lack feature information that is useful for localization and mapping. In some situations, although the camera is not malfunctioning, due to overly strong or overly weak external lights, the brightness of which exceeds a configured range for the camera to capture images and obtain feature information from the images, the captured images may lack feature information useful for localization and mapping. Under these conditions, the camera may have become ineffective. However, the processor of the autonomous mobile device may not have received notification information from the camera indicating that the camera is ineffective. Therefore, the processor may not determine that the camera is ineffective. While the camera is in a suspected ineffective state, if the wheel assembly of the autonomous mobile device is idling above a carpet of a floor, or the wheel assembly is strangled by wires or cables on the floor causing the wheel assembly to slip (i.e., the wheel assembly is rotating but the autonomous mobile device is at the same location and is not moving for an actual displacement), the autonomous mobile device is in a stranded situation. When in a stranded situation, the autonomous mobile device of conventional technology is unable to determine whether an anomaly has occurred to itself based on feedback information provided by the sensing device, other sensors, and the mileage data provided by the encoders. The autonomous mobile device may continue to attempt to move in the original mode.

As another example, in conventional technology, for an autonomous mobile device equipped with a distance measuring device (e.g., a Lidar sensor or a depth camera, etc.) as a sensing device, distance information may be acquired by the distance measuring device. Distances between the autonomous mobile device and objects (including obstacles) in the surrounding environment may be obtained. If the distance measuring device determines that the distances between the autonomous mobile device and the objects (including obstacles) in the environment have not changed, but the wheel assembly is still rotating, the slip of the wheel assembly may have caused the autonomous mobile device to experience no actual displacement. The autonomous mobile device of conventional technology may not be able to determine whether itself is in a stranded situation based on the information from the sensing device, other sensors, and the mileage data provided by the encoders. The distance measuring device may have become ineffective.

On the other hand, multiple measured parameters may be analyzed in combination to determine whether the autonomous mobile device is in a stranded situation. Such parameters may include displacement, linear velocity, and angular velocity provided by dead reckoning sensors such as encoders, a gyroscope, an accelerometer, and image feature points and/or distance data provided by the sensing device. However, even when a comprehensive determination may be made based on multiple parameters from multiple sensors, it may still not be determined 100% that the autonomous mobile device is moving normally or is in a stranded situation. This is because some information obtained by a sensor during a normal operation may be the same as the feedback information provided by the same sensor when the autonomous mobile device is in a stranded situation. Therefore, in conventional technology, information obtained by the sensor in a normal operation state and in the stranded situation may be difficult to distinguish from one another. For example, if the sensing device is a camera, assuming the camera is not malfunctioning, and assuming the ambient light is within a measurement range of the camera, but if the surrounding environment is relatively simple (e.g., large areas of white wall and there is no other obstacle), the amount of feature information in the environment is also relatively small. Then the amount of feature information that can be extracted from the captured images is small. Images captured in such a normal state appear to be similar to the images captured when the autonomous mobile device is in a stranded situation caused by an overly strong or weak environment light. Therefore, in conventional technology, a comprehensive determination based on the feature information from the images and the information from other sensors still may still not provide a definite conclusion of whether the autonomous mobile device is moving normally or is in a stranded situation. As another example, if the sensing device is a distance measuring device such as a Lidar sensor, assuming the autonomous mobile device is currently moving in parallel with an extending direction of a long hallway, and the features of the side wall and ceiling of the hallway are simple or are very similar (e.g., in the long hallway extending direction, the side wall and the ceiling are both walls of the same style, pattern, or shape), during the movement along the long hallway, the distances measured by the Lidar sensor between the autonomous mobile device and the surrounding obstacles remain the same. As a result, it cannot be determined whether the Lidar sensor is malfunctioning based on the distances measured by the Lidar sensor and the one or more motion parameters provided by the dead reckoning sensors. This appears to be similar to the situation when the Lidar sensor is malfunctioning. In conventional technology, because the normal operation states cannot be distinguished from the stranded situation, the autonomous mobile device is unable to determine whether it is in a stranded situation. In the present disclosure, a state in which the autonomous mobile device is unable to determine whether the sensing device (e.g., the camera and/or the distance measuring device) is ineffective is referred to as a "suspected ineffective state." The "suspected ineffective state" refers to the state in which feedback information provided by the sensing device is insufficient for the autonomous mobile device to determine whether it is in a stranded situation.

Embodiments of the present disclosure resolve the technical issues relating to the autonomous mobile device being unable to determine whether it is in a stranded situation due to the occurrence of the "suspected ineffective state." Regardless of whether the camera and/or the distance measuring device of the autonomous mobile device are actually ineffective, the technical solutions provided by the present disclosure can enable the autonomous mobile device to determine whether it is in a stranded situation, and can increase the rate of success of escaping from the stranded situation if the autonomous mobile device is actually in a stranded situation.

The term "ineffective" refers to ineffectiveness caused by reasons of the sensing device itself (e.g., the sensing device itself is malfunctioning), and/or the temporary ineffectiveness of the sensing device caused by the external environment (e.g., the overly strong or weak environmental light, the brightness of which exceeding the operating range of the camera, or the interference of the environmental light causing the distance measuring device to be unable to receive or recognize the distance-measuring reflection light, etc.).

Step S130, rotating at the same location (i.e., spinning around a central vertical axis of the autonomous mobile device itself) for a first predetermined spin angle.

Step S140, obtaining an estimated rotation angle of the autonomous mobile device based on one or more motion parameters acquired by a dead reckoning sensor.

The dead reckoning sensor may be an inertial measurement unit ("IMU") or encoders. The IMU may include a gyroscope and/or an accelerometer. The estimated rotation angle obtained based on one or more motion parameters acquired by a dead reckoning sensor includes a rotation angle directly measured (then the motion parameter may include the angle) by the dead reckoning sensor, or a rotation angle derived based on the motion parameters acquired by the dead reckoning sensor. The rotation angle obtained based on the one or more motion parameters acquired by the dead reckoning sensor (e.g., the IMU or the encoders) of the autonomous mobile device are typically different from the actual rotation angles, and deviate from the actual rotation angles to some extent. The rotation angle of the autonomous mobile device obtained by detection through the dead reckoning sensor (including the angle obtained by derivation from the one or more motion parameters acquired by the dead reckoning sensor) is actually an estimated rotation angle. The estimated rotation angle is used for the comparison and determination in subsequent steps. In some embodiments, the rotation angle may be obtained by integration of the angular velocity measured by the gyroscope.

Step S150, comparing the estimated rotation angle of the autonomous mobile device with the first predetermined spin angle. Based on a determination that a difference (the difference may be an absolute value) between the estimated rotation angle and the first predetermined spin angle is greater than a first predetermined threshold value, the autonomous mobile device may execute step S160; otherwise, the autonomous mobile device may execute step S110.

Steps S130-S150 provide a method for detecting whether the autonomous mobile device is in a stranded situation. That is, after the step S120 is executed and after it has been determined that the sensing device is in the suspected ineffective state, the autonomous mobile device may rotate at the same location (i.e., spinning around a central vertical axis of the autonomous mobile device itself) for a predetermined spin angle (e.g., 90°), and then obtain (e.g., detect, calculate, or determine) the estimated rotation angle of the autonomous mobile device based on one or more motion parameters acquired by a dead reckoning sensor, e.g., an IMU (such as a gyroscope, an accelerometer), or encoders. In an example, the estimated rotation angle may be 80°. If the absolute value (e.g., 10°) of the difference between the estimated rotation angle and the first predetermined spin angle is greater than the first predetermined threshold value (e.g., 5°), then the autonomous mobile device may determine that it is in a stranded situation. At this moment, the autonomous mobile device may execute the escape instructions to escape from the stranded situation. It is noted that the 90° predetermined spin angle is an example angle. To determine whether the autonomous mobile device is in the stranded situation, the autonomous mobile device may rotate for any suitable angle. In addition, prior to execute step S160, the autonomous mobile device may or may not rotate back the 90° predetermined spin angle (or any other suitable predetermined spin angle) to return to its initial heading direction.

Step S160, executing the escape instructions. The escape instructions, when executed, may cause the autonomous mobile device to perform the following functions or operations:

Step S1601, moving backwardly for a first predetermined distance. The backward movement may start from the stranded location. The backward movement direction may be opposite to a heading direction of the autonomous mobile device after the autonomous mobile device has completed the determination that the autonomous mobile device is in the stranded situation. In some embodiments, the autonomous mobile device may adjust its heading direction after completing the determination that the autonomous mobile device is in the stranded situation and before it starts moving backwardly. After moving backwardly for the first predetermined distance, the autonomous mobile device may arrive at a new initial location.

Step S1602, moving along a curve, or a folded line, to circumvent the stranded location. Starting at the new initial location, the autonomous mobile device may move along the curve or the folded line to go around the stranded location, to arrive at a new location where the autonomous mobile device is out of the stranded situation.

In some embodiments, moving backwardly for the first predetermined distance may include moving backwardly from the stranded location, for a distance corresponding to a predetermined duration. For example, the autonomous mobile device may move backwardly for 5 seconds.

Figure 1B:
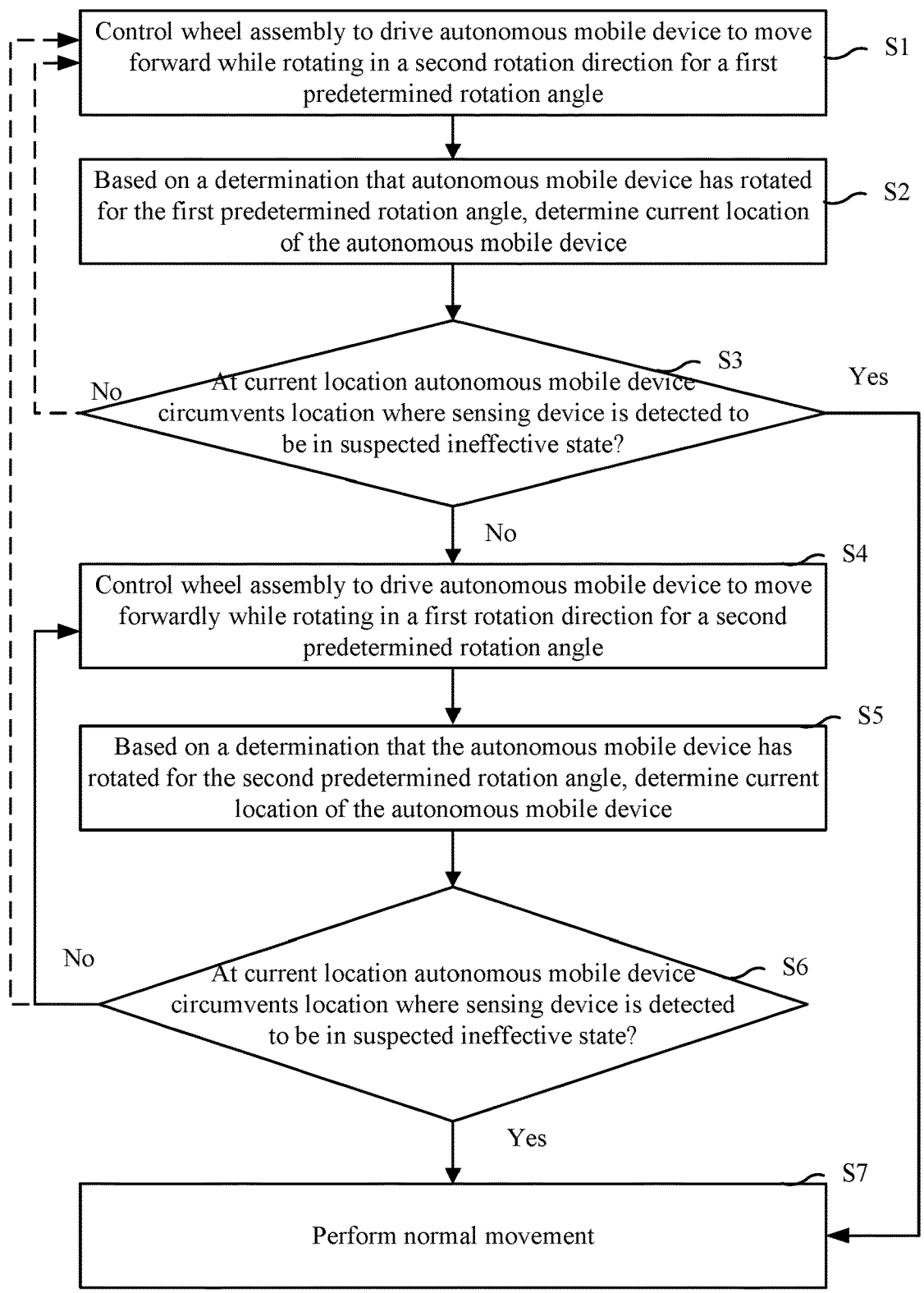
FIG. 1B is a flowchart illustrating an escape method executable by an autonomous mobile device when the autonomous mobile device moves along a curve, according to another embodiment of the present disclosure.

In some embodiments of the present disclosure, when step S1602 is executed, the autonomous mobile device may move along a curve through the following steps, as shown in FIG. 1B: Step S1, controlling the wheel assembly to drive the autonomous mobile device to move forwardly while rotating in a second rotation direction for a first predetermined rotation angle. Step S2, based on a determination that the autonomous mobile device has rotated for the first predetermined rotation angle, determining the current location of the autonomous mobile device. Step S3, comparing the current location of the autonomous mobile device determined in the step S2 with the stranded location. Based on a determination that at the current location the autonomous mobile device circumvents the stranded location (Yes, step S3), the autonomous mobile device may perform a normal movement. Otherwise (No, step S3), the autonomous mobile device may execute step S1 or S4. Step S4, controlling the wheel assembly to drive the autonomous mobile device to move forwardly while rotating in a first rotation direction for a second predetermined rotation angle. Step S5, based on a determination that the autonomous mobile device has rotated for a second predetermined rotation angle, determining the current location of the autonomous mobile device. Step S6, comparing the current location of the autonomous mobile device determined in the step S5 with the stranded location. Based on a determination that at the current location determined in the step S5 the autonomous mobile device circumvents the stranded location (Yes, step S6), the autonomous mobile device may perform a normal movement (step S7). Otherwise (No, step S6), the autonomous mobile device may repeat the execution of steps S1-S3 or S4-S6, until at the current location determined in the step S5 the autonomous mobile device circumvents the stranded location. The first rotation direction and the second rotation direction may be the same or different. The first predetermined rotation angle and the second predetermined rotation angle may be the same or different.

Figure 1C:
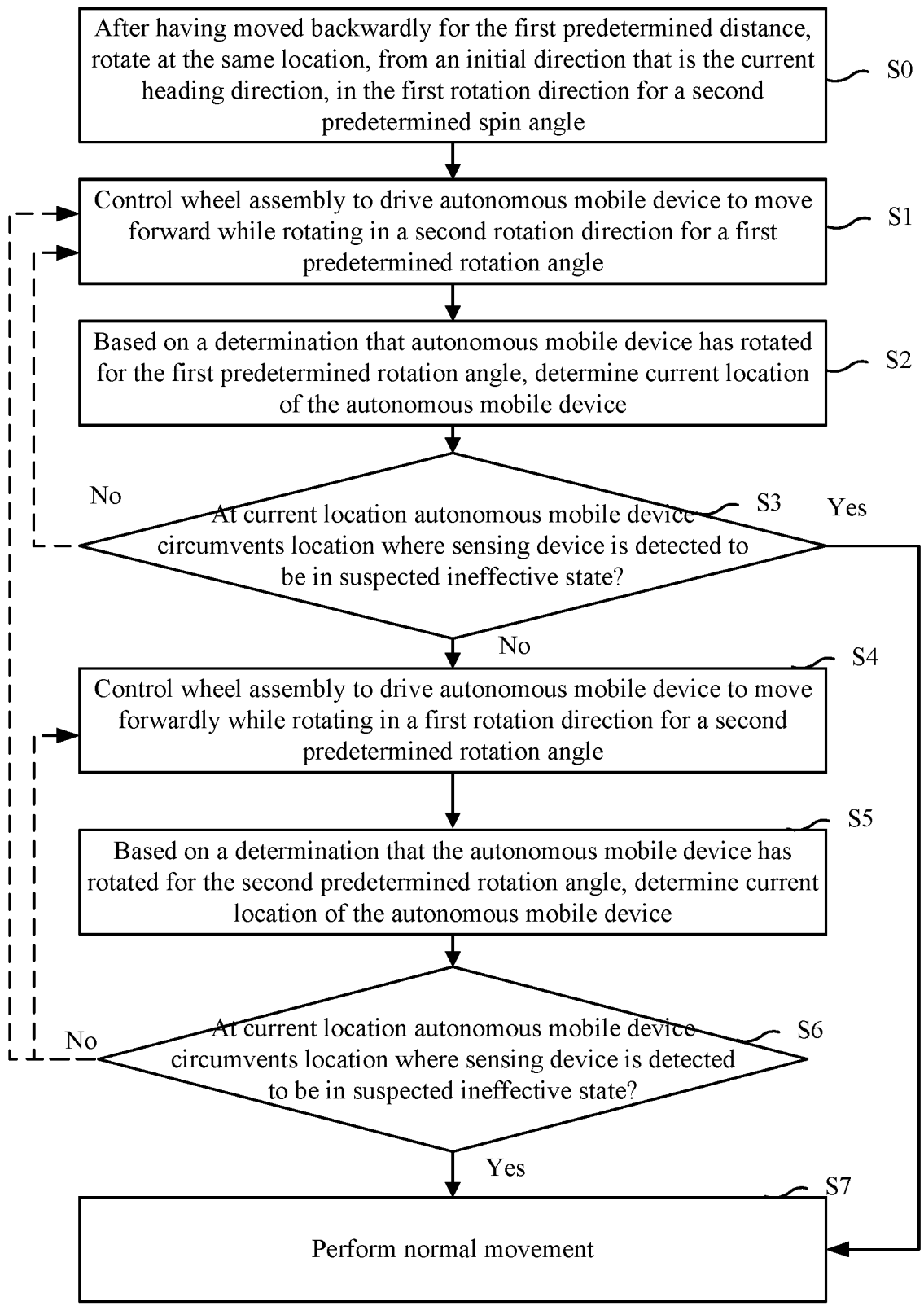
FIG. 1C is a flowchart illustrating an escape method executable by an autonomous mobile device when the autonomous mobile device moves along a curve, according to another embodiment of the present disclosure.

In some embodiments of the present disclosure, after step S1601 is executed, as shown in FIG. 1C, step S0 may be executed. Step S0, after having moved backwardly for the first predetermined distance, rotating at the same location, from an initial direction that is the current heading direction after the autonomous mobile device has moved backwardly for the first predetermined distance, in the first rotation direction for the second predetermined spin angle.

Figure 1D:
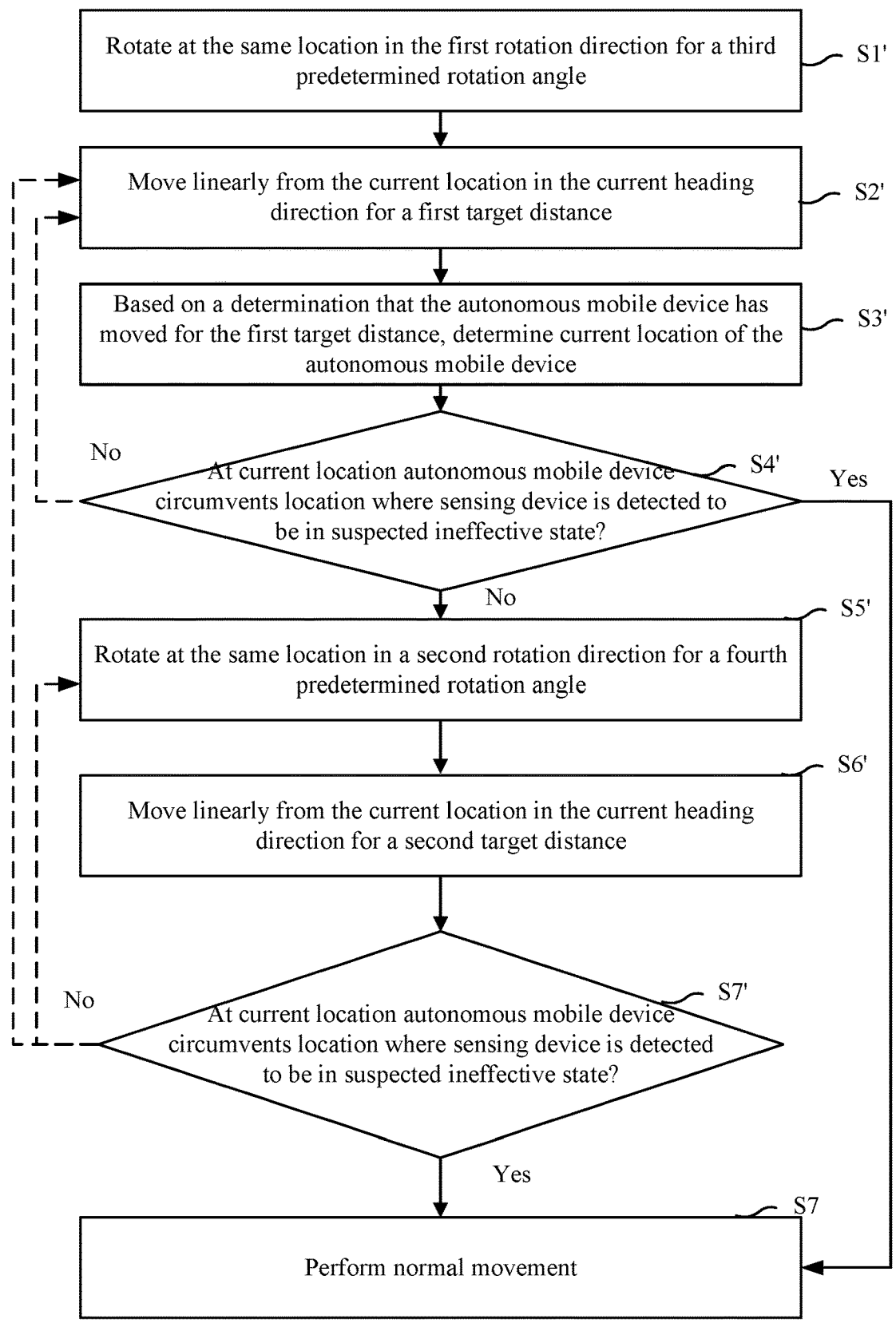
FIG. 1D is a flowchart illustrating an escape method executable by an autonomous mobile device when the autonomous mobile device moves along a curve, according to another embodiment of the present disclosure.

In some embodiments, when executing step S1602, as shown in FIG. 1D, the autonomous mobile device may move along a folded line through the following steps: Step S1', rotating at the same location (i.e., spinning around a central vertical axis of the autonomous mobile device itself) in the first rotation direction for a third predetermined spin angle. Step S2', moving linearly from the current location in the current heading direction for a first target distance. Step S3', based on a determination that the autonomous mobile device has moved for the first target distance, determining the current location of the autonomous mobile device. Step S4', comparing the current location of the autonomous mobile device determined in the step S3' with the stranded location. Based on a determination that at the current location determined in the step S3' the autonomous mobile device circumvents the stranded location (Yes, step S4'), the autonomous mobile device may perform a normal movement (step S7). Otherwise (No, step S4'), the autonomous mobile device may execute step S1' or S5'. Step S5', at the current location determined in the step S3', rotating at the same location in the second rotation direction for the fourth predetermined spin angle. Step S6', moving linearly from the current location determined in the step S3' in the current heading direction (after the rotating at the same location in the step S5') for the second target distance. Step S7', comparing the current location of the autonomous mobile device (after moving for the second target distance) with the stranded location. Based on a determination that at the current location (the same as in the step S6') the autonomous mobile device circumvents the stranded location (Yes, step S7'), the autonomous mobile device may perform a normal movement (step S7). Otherwise (No, step S7'), the autonomous mobile device may execute steps S1'-S4' or S5'-S7', until at the current location (the current location in steps S6' and S7') the autonomous mobile device circumvents the stranded location. The first rotation direction and the second rotation direction may be the same or different. The third predetermined spin angle and the fourth predetermined spin angle may be the same or different. The first target distance and the second target distance may be the same or different.

Next, the technical solutions of the present disclosure will be described in detail with reference to the accompanying drawings: FIG. 2A to FIG. 2E show embodiments in which the autonomous mobile device moves along a curve to escape the stranded situation; FIG. 2F shows an embodiment in which the autonomous mobile device moves along a folded line to escape the stranded situation. As shown in the drawings, the movement of the autonomous mobile device along the curve or folded line can be performed in various manners.

Figure 2A:
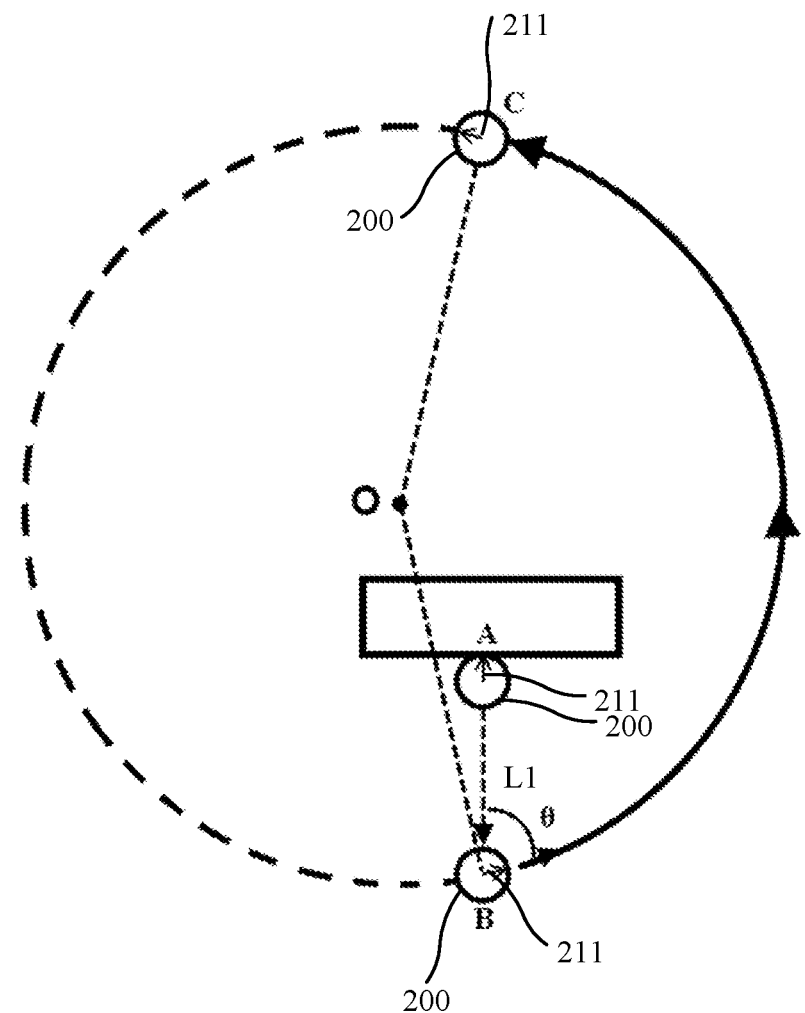
FIG. 2A is a schematic illustration of the autonomous mobile device escaping from a stranded situation, according to an embodiment of the present disclosure.
Figure 2B:
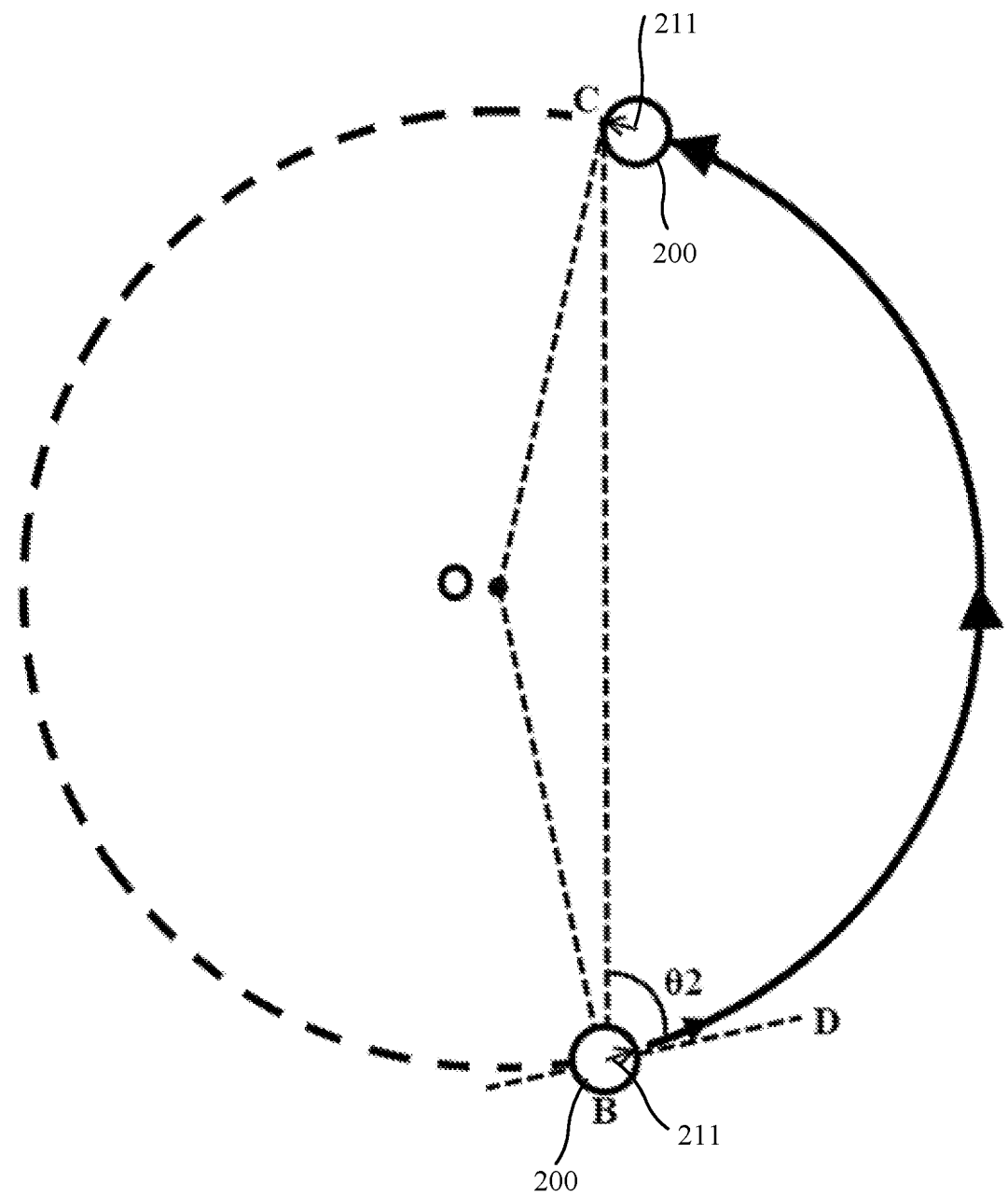
FIG. 2B is a schematic illustration of the autonomous mobile device escaping from a stranded situation, according to an embodiment of the present disclosure.

FIG. 2A is a schematic illustration of the autonomous mobile device escaping from the stranded situation by moving along a curve, according to an embodiment of the present disclosure.

FIG. 2A shows an embodiment of the present disclosure. When an autonomous mobile device 200 moves to a location A, the autonomous mobile device may detect or determine, through the sensing device carried by the autonomous mobile device, that it may be in a suspected stranded state (also referred to as a "suspected ineffective state"). That is, the sensing device of the autonomous mobile device is in a suspected ineffective state. For example, when the autonomous mobile device moves in a dark space under a bed for a long time, but the autonomous mobile device does not receive feedback information provided by the collision sensor or the proximity sensor indicating the stranded situation (for the collision sensor, the information indicating the stranded situation can be the collision sensor being triggered; for the proximity sensor, the information indicating the stranded situation can be the proximity sensor detecting an obstacle in a predetermined distance range). In addition, the autonomous mobile device does not receive an error notification from the motion unit and/or the dead reckoning sensor. The error notification may indicate that the wheel assembly is not rotating, which may be detected through an electric current and/or electric voltage of a motor. In some embodiments, the error notification may indicate that the encoders have detected that the autonomous mobile device is not moving. In some embodiments, the error notification may indicate that although the wheel assembly is operating, it contradicts with the motion parameters measured by the encoders, the gyroscope, and/or the accelerometer. Although not shown in FIG. 2A, according to step S130, at the location A, the autonomous mobile device 200 may rotate at the same location (i.e., rotates relative to a central vertical axis of itself) for the first predetermined spin angle (e.g., 90°). That is, the heading direction (indicated by the arrow 211) may be rotated for 90° (not shown in FIG. 2A). The autonomous mobile device may obtain an estimated rotation angle based on one or more motion parameters acquired by a dead reckoning sensor. For example, the estimated rotation angle may be calculated via integration based on one or more motion parameters measured through the IMU, such as an angular velocity. The autonomous mobile device may compare the estimated rotation angle and the first predetermined spin angle. Based on a determination that a difference (which may be an absolute value) between the estimated rotation angle and the first predetermined spin angle is greater than the first predetermined threshold value, the autonomous mobile device may determine that the autonomous mobile device is in a stranded situation. Hence, the autonomous mobile device may execute escape instructions. The first predetermined threshold value may be set as 5°. For example, the autonomous mobile device may rotate at the same location (i.e., at the location A) for the first predetermined spin angle of 90°. The estimated rotation angle obtained through one or more motion parameters provided by a dead reckoning sensor, e.g., a gyroscope, may be 0° (i.e., the motion unit may be lifted or stuck, causing the autonomous mobile device to be unable to perform the rotation movement), the difference may be 90°−0°=90°, which is greater than the first predetermined threshold value of 5°. The location A may be a suspected stranded situation point (i.e., a stranded location). The autonomous mobile device may execute escape instructions for escaping from the stranded situation at location A. Alternatively, based on a determination that the estimated rotation angle obtained based on one or more motion parameters acquired by, e.g., the gyroscope, is 45° (i.e., the autonomous mobile device may not be able to rotate for a predetermined angle according to the control command due to slip, such a location also belongs to the above suspected stranded point), the difference may be 90°−45°=45°, which is also greater than the first predetermined threshold value of 5°. The autonomous mobile device may execute the escape instructions. Conversely, if the first predetermined threshold value is set to be 5°, the autonomous mobile device rotates at the same location for the first predetermined angle of 90°, and the estimated rotation angle obtained based on one or more motion parameters acquired by a dead reckoning sensor, e.g., the gyroscope, is 87°, then the difference is 90°−87°=3°, which is smaller than the predetermined threshold value of 5°. This difference between the estimated rotation angle obtained based on one or more motion parameters acquired by a dead reckoning sensor and the first predetermined spin angle may be caused by the errors in the gyroscope. The difference may be regarded as being within a range of typical errors. As such, the autonomous mobile device may not execute the escape instructions. Because the effect of the accumulative error of the sensors such as the gyroscope and the accelerometer is taken into account, in order to avoid a false determination regarding whether the autonomous mobile device is in a stranded situation, the first predetermined threshold value is not set to be too small, such as 0.1°, or too large, such as 50°, which may also cause a false determination. For example, if the first predetermined threshold value is set to be 50°, when the first predetermined spin angle for the rotation of the autonomous mobile device at the same location is set to be 45°, and the autonomous mobile device does not actually rotate at all, then the difference between the estimated rotation angle and the first predetermined angle is 45°−0°=45°, which is smaller than the first predetermined threshold value of 50°. Thus, the autonomous mobile device may determine that it is not in a stranded situation. However, actually, the autonomous mobile device cannot rotate, and should be determined as being in a stranded situation. As such, the setting of the first predetermined threshold value can be based on a combination of factors such as the performance of the sensors, and the first predetermined spin angle relating to the spinning of the autonomous mobile device. In some embodiments, a range of the first predetermined threshold value may be 5° to 30°. The first predetermined threshold value may be any value from this range. In this range, the chance of producing a false determination may be reduced.

In some embodiments, the first predetermined threshold value may not be a fixed value. Instead, the first predetermined threshold value may be a value that has a relationship with the first predetermined spin angle. For example, the first predetermined threshold value may be proportional to the first predetermined spin angle. For example, the first predetermined threshold value may be set to be 10% of the first predetermined spin angle. Similar to the above scenario, when the first predetermined spin angle is 90°, the first predetermined threshold value may be 90°×10%=9°. If the estimated rotation angle obtained based on one or more motion parameters acquired by a dead reckoning sensor, e.g., the gyroscope, is 85°, then the difference is 90°−85°=5°, which is smaller than the first predetermined threshold value of 9°. Accordingly, the autonomous mobile device may not execute escape instructions. Conversely, if the estimated rotation angle based on one or more motion parameters acquired by a dead reckoning sensor, e.g., the gyroscope, is 10°, then the difference is 90°−10°=80°, which is greater than the first predetermined threshold value of 9°. Accordingly, the autonomous mobile device may execute the escape instructions. In some embodiments, a minimum value may be set for the first predetermined spin angle. For example, the first predetermined spin angle may be greater than 15°, in order to make the first predetermined threshold value sufficiently large, larger than the accumulative errors of the sensors such as the gyroscope and the accelerometer.

As shown in FIG. 2A, after determining that the autonomous mobile device is in a stranded situation at the location A, the autonomous mobile device may move backwardly for a first predetermined distance L1 to a location B. It is noted that the heading direction 211 at the location A is for illustrative purposes. The heading direction 211 at the location A may be in any suitable direction. After the autonomous mobile device moves backwardly from the location A to the location B, the current heading direction at the location B may be used as an initial direction (in the example shown in FIG. 2A, the initial direction is the same as the heading direction 211 at the location A, i.e., the perpendicularly upward direction). At the location B, from the initial direction, the autonomous mobile device 200 may rotate at the same location (i.e., spin) in the first rotation direction (e.g., clockwise direction) for the second predetermined spin angle θ (e.g., 85°). Thus, the heading direction 211 at the location B may be rotated for the second predetermined spine angle θ to the direction shown in FIG. 2A. Then, the autonomous mobile device may control the wheel assembly, such that the wheels rotate in the same direction but at different speeds. This type of rotation of the wheels may generate a combination of a linear movement and a rotation. Thus, the autonomous mobile device may move forwardly while rotating relative to a reference point on the floor, such as the fixed point O. This movement creates a curve moving path, such as an arc moving path or moving trajectory BC, as shown in FIG. 2A. The rotation of the autonomous mobile device may be independent of the forward movement. In the present embodiment, the arc may be a circular arc, i.e., a portion of a circle having a center at the fixed point O on the floor or in the space. In other embodiments, the arc may not be a circular arc (i.e., may not be a portion of a circle having the fixed point O as the center). The rotation for a predetermined angle refers to the change in the heading direction 211 (represented by an angle), or the rotation of a local coordinate system deemed to be fixed on the autonomous mobile device. While moving from the location B to the location C, at any location along the arc moving path, the rotation angle of the heading direction 211 of the autonomous mobile device relative to the initial heading direction 211 at the location B may be determined. The rotation angle of the heading direction of the autonomous mobile device may be obtained based on one or more motion parameters acquired by the gyroscope. When the autonomous mobile device determines that the rotation angle has reached a first predetermined rotation angle (e.g., 80°) as required by the control command, assuming at this moment the autonomous mobile device has reached the location C as shown in FIG. 2A, the relative positional relationship between the coordinates of the location C and the location A may be determined. The coordinates of the location C may be determined based on data acquired by one or more dead reckoning sensors and/or a motion unit. When the relative positional relationship between the location C and the location A indicates that at the location C the autonomous mobile device circumvents the location A (a stranded location), which means that the autonomous mobile device has successfully escaped from a stranded situation, the autonomous mobile device may perform a normal subsequent movement (i.e., may move in a normal mode). When the autonomous mobile device has moved from the initial location B located below the location A in FIG. 2A, along the arc moving path to arrive at the location C located above the location A, the location C may be deemed as a location where the autonomous mobile device circumvents the location A. The detailed descriptions of this embodiment and the drawing can refer to the detailed descriptions of FIG. 2B, which are omitted here.

Figure 2C:
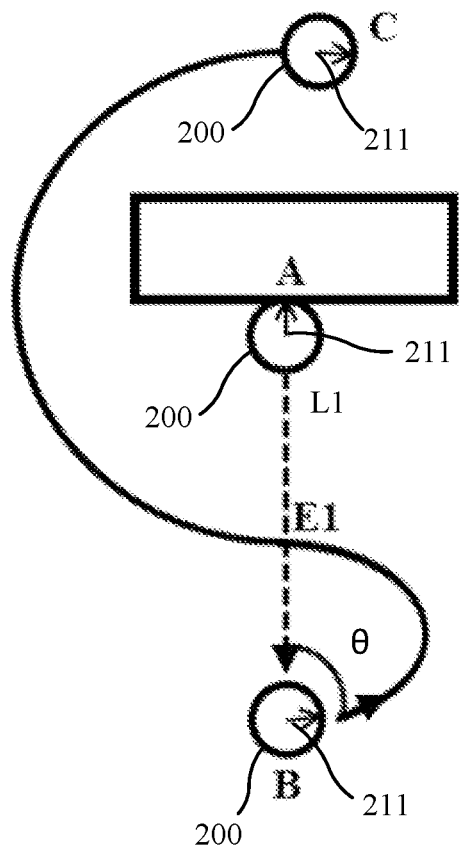
FIG. 2C is a schematic illustration of the autonomous mobile device escaping from a stranded situation, according to an embodiment of the present disclosure.

In the embodiment shown in FIG. 2C, using the current heading direction after the autonomous mobile device has moved backwardly from the location A for the first predetermined distance to the location B as the initial direction, the autonomous mobile device may rotate at the same location (i.e., location B) in the first rotation direction (e.g., clockwise direction) for the second predetermined spin angle θ (e.g., 85°). Starting at the location B, the autonomous mobile device may control the wheel assembly such that the autonomous mobile device moves forwardly while rotating in the second rotation direction (e.g., counter-clockwise direction), until the autonomous mobile device has rotated (or the heading direction 211 has rotated) for a first predetermined rotation angle (such as 175°). Moving forwardly while rotating typically creates an arc moving path or moving trajectory. The arc may or may not be a circular arc or a portion of a circle having a fixed point as a center. Here, while the autonomous mobile device moves along the curve BC, the rotation angle of the autonomous mobile device refers to the change (in terms of an angle) in the heading direction 211. The rotation may be independent of the forward movement. While the autonomous mobile device moves along the curve BC, when an angle of rotation obtained based on the one or more motion parameters acquired by the gyroscope has reached 175° as required by the control command, assuming that the autonomous mobile device has reached a location E1, the autonomous mobile device may determine a relative positional relationship between the coordinates of the location E1 and the location A. The coordinates of the location E1 may be obtained based on one or more motion parameters acquired by one or more dead reckoning sensors and/or motion unit. If the autonomous mobile device determines that at the location E1 the autonomous mobile device does not circumvent the location A, the autonomous mobile device may control the wheel assembly such that the autonomous mobile device continues to move forwardly (from the location E1) while rotating in a first rotation direction until the autonomous mobile device has rotated for a second predetermined rotation angle (e.g., 180°) since the location E1. At this moment, the autonomous mobile device may have moved to the location C. The second predetermined rotation angle may be the same as or different from the first predetermined rotation angle. As shown in FIG. 2C, the location E1 is still below the location A (a stranded location), and is not beyond the location A. The location E1 is between the location A and the initial location B of the autonomous mobile device (the location B is the initial location for the autonomous mobile device to start moving along a curve in order to circumvent the location A). Assuming that according to the escape instructions, the autonomous mobile device moves along the curve moving path from the location E1 until the rotation angle (i.e., the change of the heading direction 211) reaches 180° (i.e., until the autonomous mobile device arrives at the location C). At the location C, the autonomous mobile device may determine a positional relationship between the coordinates of the location C and the location A. The coordinates of the location C may be obtained based on one or more motion parameters acquired by one or more dead reckoning sensors and/or the motion unit. Based on a determination that at the location C the autonomous mobile device circumvents the location A (a stranded location), the autonomous mobile device may determine that it has successfully escaped from the stranded situation. Subsequently, the autonomous mobile device may perform a normal movement. As shown in FIG. 2C, the autonomous mobile device has moved from the initial location B located below the location A shown in FIG. 2C, around the location A, and reached the location C located above the location A shown in FIG. 2C. That is, the autonomous mobile device has circumvented the stranded location A.

Figure 2D:
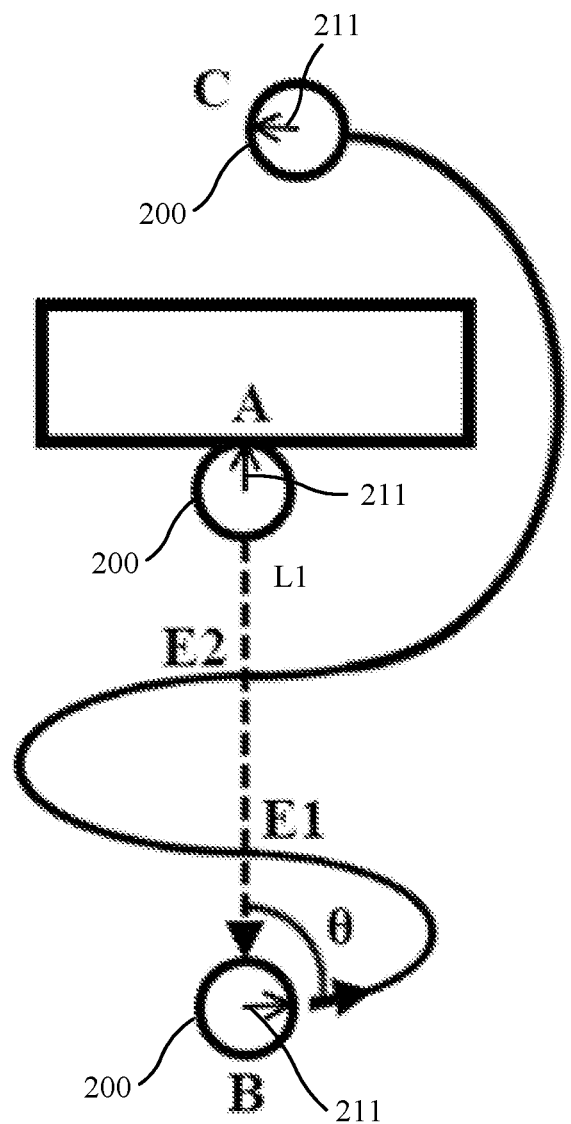
FIG. 2D is a schematic illustration of the autonomous mobile device escaping from a stranded situation, according to an embodiment of the present disclosure.

In the embodiment shown in FIG. 2D, using the current heading direction (the same as the heading direction 211 at the location A) after the autonomous mobile device has moved backwardly from the location A to the location B as the initial direction, the autonomous mobile device may rotate at the same location in the first rotation direction (e.g., clockwise direction) for the second predetermined spin angle θ (e.g., 85°). With the new heading direction 211 (as shown in FIG. 2D) at the location B, the autonomous mobile device may control the wheel assembly such that the autonomous mobile device moves forwardly while rotating along a curve, in the second rotation direction (e.g., counter-clockwise direction), until the autonomous mobile device has rotated (or the heading direction 211 has rotated) for the first predetermined rotation angle (e.g., 175°). At this moment, the autonomous mobile device may have arrived at the location E1. While the autonomous mobile device moves from the location B to the location E1 along the curve moving path, the autonomous mobile device may calculate a rotation angle based on one or more motion parameters acquired by a dead reckoning sensor (e.g., the gyroscope). When the rotation angle reaches 175° as configured by the control command, and assuming that the autonomous mobile device has reached the location E1, the autonomous mobile device may determine a relative positional relationship between the coordinates of the location E1 and the location A. Based on a determination that at the location E1 the autonomous mobile device does not circumvent (or is not beyond) the location A, the autonomous mobile device may further control the wheel assembly such that the autonomous mobile device continues to move forwardly while rotating in the first rotation direction along a curve moving path, until the autonomous mobile device has rotated (relative to the location E1) for the second predetermined rotation angle (e.g., 180°). At this moment, the autonomous mobile device arrives at a location E2. The autonomous mobile device may determine a relative positional relationship between the location E2 and the location A. Based on a determination that the coordinates of the location E2 indicate that at the location E2 the autonomous mobile device does not circumvent the location A (as shown in FIG. 2D, the location E2 is still located below the location A, and does not go beyond the location A), the autonomous mobile device may control the wheel assembly such that the autonomous mobile device continues to move forwardly while rotating in the second rotation direction for the first predetermined rotation angle (e.g., 180°) (relative to the location E2). At this moment, the autonomous mobile device may have arrived at the location C. It should be noted that the first predetermined rotation angle from the location E2 to the location C may be different from the first predetermined rotation angle of 175° in the corresponding step of the last repeating cycle from the location A to the location E1. In the present disclosure, for the convenience of description and simplicity, the same term "the first predetermined rotation angle," or "the second predetermined rotation angle," "the first predetermined spin angle," or "the second predetermined spin angle," or "the third predetermined spin angle," or "the fourth predetermined spin angle," or "the first target distance," or "the second target distance," may be set to be different values in corresponding steps of different repeating cycles. For example, the first predetermined rotation angle at the location B and the first predetermined rotation angle at the location E2 belong to steps of different and independent repeating cycles (both belonging to the repeated steps of S1-S3 of different repeating cycles). Therefore, although they are both referred to as "the first predetermined rotation angle," the values may be set to be different. Such differences do not cause misunderstanding in the technical solutions, and do not cause contradiction to the technical solutions. The use of the same terms is merely for the purpose of simplicity and convenience. Assuming at this moment the autonomous mobile device arrives at the location C, the autonomous mobile device may determine a relative positional relationship between the coordinates of the location C and the location A. Based on a determination that at the location C the autonomous mobile device circumvents the location A (a stranded location), e.g., on the other side of the location A as compared with the location B, the autonomous mobile device may determine that it has escaped from the stranded situation, and may perform a normal movement subsequently. It is noted that the location C is not necessarily located on the other side of the location A as compared with the location B. As shown in FIG. 2D, the autonomous mobile device has moved from an initial location (location B) below the location A around the location A to reach the location C located above the location A.

Figure 2E:
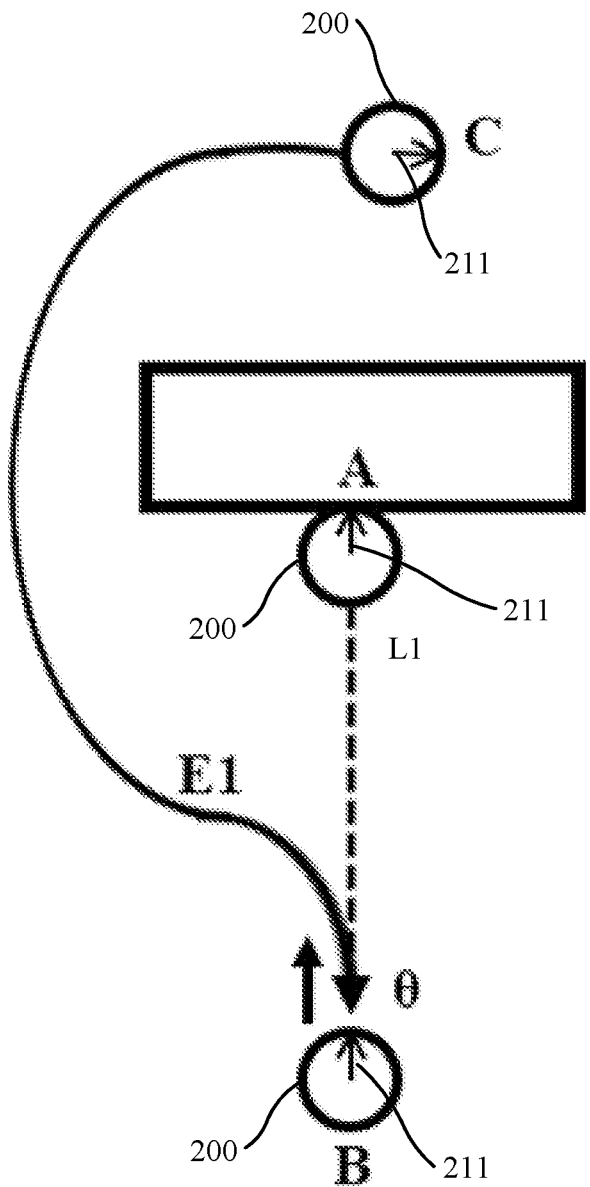
FIG. 2E is a schematic illustration of the autonomous mobile device escaping from a stranded situation, according to an embodiment of the present disclosure.
Figure 2F:
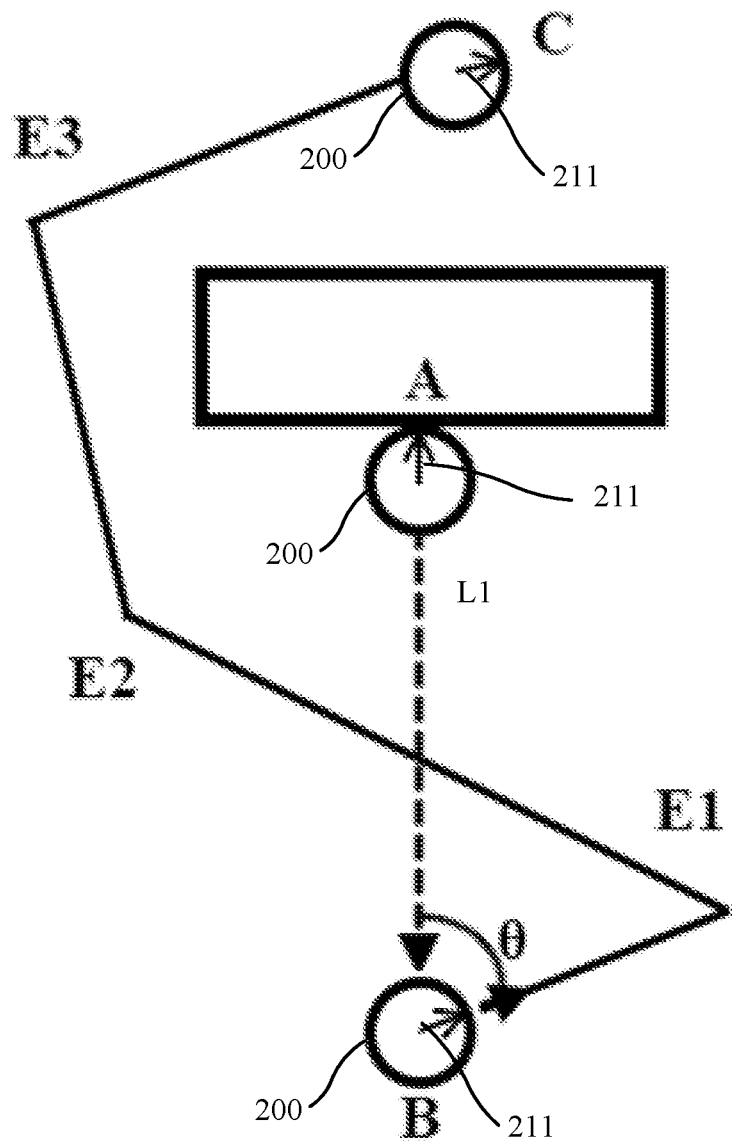
FIG. 2F is a schematic illustration of the autonomous mobile device escaping from a stranded situation, according to an embodiment of the present disclosure.

In the embodiment shown in FIG. 2E, after having moved backwardly from the location A for the first predetermined distance to the location B, the autonomous mobile device does not rotate at the same location for an angle. Instead, the autonomous mobile device maintains the current heading direction (the heading direction 211 at the location B), and in the current heading direction, controls the wheel assembly such that the autonomous mobile device moves forwardly while rotating in the second rotation direction (e.g., counter-clockwise direction), until the autonomous mobile device has rotated for a predetermined rotation angle (e.g., 90°) to arrive at the location E1. During the movement from the location B to the location E1, the autonomous mobile device may calculate the rotation angle based on one or more motion parameters acquired by a dead reckoning sensor (e.g., the gyroscope). When the rotation angle has reached 90°, assuming at this moment the autonomous mobile device arrives at the location E1, the autonomous mobile device may determine the relative positional relationship between the coordinates of the location E1 and the location A. Based on a determination that at the location E1 the autonomous mobile device does not circumvent the location A, the autonomous mobile device may control the wheel assembly such that the autonomous mobile device continues to move forwardly while rotating in the first rotation direction (e.g., clockwise direction) from the location E1, until the autonomous mobile device has rotated for a predetermined rotation angle (e.g., 180°) to arrive at the location C. Assuming at this moment the autonomous mobile device may determine that the rotation angle has reached 180° (as compared with the heading direction at the location E1). At the location C, the autonomous mobile device may determine the relative positional relationship between the coordinates of the location C and the location A. Based on a determination that at the location C the autonomous mobile device circumvents the location A (a stranded location), then the autonomous mobile device may determine that it has successfully escaped from the stranded situation. As shown in FIG. 2E, the autonomous mobile device has moved from an initial location B located below the location A, around the location A, to arrive at the location C located above the location A.

An example of the movement of the autonomous mobile device along a folded line is shown in FIG. 2F. After having moved backwardly (i.e., in a direction opposite to the heading direction 211 at the location A) from the location A for the predetermined distance, the autonomous mobile device may be located at the location B. Using the current heading direction at the location B (i.e., the current heading direction after the autonomous mobile device has moved backwardly from the location A) as the initial direction (note the initial direction is the same as the heading direction 211 at the location A), the autonomous mobile device may rotate at the same location (at location B) in the first rotation direction (e.g., clockwise direction) for the third predetermined spin angle $\theta'$ (e.g., 85°). The autonomous mobile device may then control the wheel assembly, such that the autonomous mobile device moves linearly and forwardly for the first target distance to arrive at the location E1. Based on a determination that the displacement measured by, e.g., the encoders or an optical flow, has reached the first target distance, the autonomous mobile device may determine that it has reached the location E1. The autonomous mobile device may determine a relative positional relationship between the coordinates of the location E1 and the location A. Based on a determination that at the location E1 the autonomous mobile device does not circumvent the location A, the autonomous mobile device may control the wheel assembly to rotate at the same location in the second rotation direction (e.g., counter-clockwise direction) for the fourth predetermined spin angle (e.g., 135°). The autonomous mobile device may control the wheel assembly, such that the autonomous mobile device moves linearly and forwardly for a second target distance to arrive at the location E2. Based on a determination that the displacement measured by, e.g., the encoders or the optical flow, has reached the second target distance as set by the control command, the autonomous mobile device may determine that it has reached the location E2. The autonomous mobile device may determine a relative positional relationship between the coordinates of the location E2 and the location A. Based on a determination that the coordinates of the location E2 indicate that at the location E2 the autonomous mobile device does not circumvent the location A (as shown in FIG. 2F, the location E2 is below the location A, and is not at a location above the location A), the autonomous mobile device may control the wheel assembly, such that the autonomous mobile device rotates at the same location in the first rotation direction (e.g., clockwise direction) for a third predetermined spin angle (e.g., 60°). That is, at the location E2, the autonomous mobile device may change its heading direction by 60° clockwise. It is noted that the third predetermined spin angle here may be the same as or different from the third predetermined spin angle in the corresponding step of the previous cycle or other cycles. For example, the angle may be 60° in this cycle (at the location E2), different from the 85° in the previous cycle (at the location B). The autonomous mobile device may then control the wheel assembly, such that the autonomous mobile device moves linearly and forwardly for a first target distance to arrive at the location E3. It is noted that the first target distance in this cycle may be the same as or different from the first target distance in the step of the previous cycle or other cycles. Based on a determination that the displacement measured by, e.g., the encoders or the optical flow, has reached the target distance as set by the control command, the autonomous mobile device may determine that it has arrived at the location E3. The autonomous mobile device may determine a relative positional relationship between the coordinates of the location E3 and the location A. As shown in FIG. 2F, based on a determination that at the location E3 the autonomous mobile device circumvents the location A (a stranded location), the autonomous mobile device may determine that it has escaped from the stranded situation. As shown in FIG. 2F, the autonomous mobile device has moved from a location below the location A, around the location A, to the location E3 that is above the location A. In some embodiments, at this moment at the location E3, the autonomous mobile device may further control the wheel assembly such that the autonomous mobile device rotates at the same location in the first rotation direction (e.g., clockwise direction) for a third predetermined spin angle (e.g., 90°). That is, the autonomous mobile device may change its heading direction by 90° clockwise. It is noted that the third predetermined spin angle may be the same as or different from the third predetermined spin angle in the corresponding step of the previous cycle. Then the autonomous mobile device may control the wheel assembly such that the autonomous mobile device moves linearly and forwardly for a first target distance to arrive at the upper portion of the extension line of the segment BA as shown in FIG. 2F, i.e., the location C that is the crossing point of the extension line of the segment BA and the current trajectory of the autonomous mobile device. At the location C, the moving direction (or heading direction) of the autonomous mobile device may be the same as the moving direction at the location B. It is noted that the first target distance in this cycle may be the same as or different from the first target distance in the previous cycle.

As shown in the above embodiments, the autonomous mobile device may move along a curve, or a folded line, which provides flexibility. Each angle or distance may be a fixed value, or may be a value obtained based on the previous rotation angle or moving distance, or may be random values. For example, based on the formula $r=v/\omega$, setting the linear velocity v and angular velocity $\omega$ can control the radius r (the distance OB shown in FIG. 2A) corresponding to the circle, which includes the circular arc trajectory of movement of the autonomous mobile device (the circular arc is the arc BC shown in FIG. 2A), to be greater than the first predetermined distance L1, i.e., the distance for which the autonomous mobile device moves backwardly from the stranded location A. Through this configuration, the arc of the circle having the radius r is sufficiently large. In this manner, the autonomous mobile device can move for a sufficiently large rotation angle or a sufficiently large distance (or arc) to circumvent the location A (a stranded location). As a result, the autonomous mobile device can escape from the stranded situation at the location A.

The above-described movement of the autonomous mobile device along a curve or a folded line can be implemented in combination.

Through the above steps, the autonomous mobile device automatically determines, based on the environmental data acquired by the sensing device, whether the sensing device is in the suspected ineffective state, and automatically escape from the stranded situation after determining that the sensing device is in the suspected ineffective state.

In some embodiments of the present disclosure, the sensing device may include an image capturing device (e.g., a camera). Step S110 may be implemented specifically as: moving in the work environment, and obtaining the images captured by the image capturing device.

The step S120, determining, based on the environmental data acquired by the sensing device, whether the sensing device is in the suspected ineffective state may include at least one of the following methods:

In a first method, based on a determination that the quantity (or number) of image features extracted from the acquired images is smaller than a predetermined number, and/or the unqualified image ratio is greater than a predetermined unqualified image ratio, the autonomous mobile device may determine that the image capturing device is in the suspected ineffective state.

When defining the "suspected ineffective state" above, it has been mentioned that one of the reasons that the camera is in the "suspected ineffective state" may be: although the camera is malfunctioning, the camera can still provide images, and the images lack feature information for localization and mapping. Therefore, when determining whether the camera is in the suspected ineffective state, image features (i.e., feature points in the images that represent objects) may be extracted from the images captured by the camera. If the number of extracted image features is smaller than the predetermined number, the autonomous mobile device may determine that the camera is in the suspected ineffective state. For example, if the number of feature points extracted from the images is smaller than the minimum number of feature points of the environmental objects to be recognized, as specified by the SLAM algorithm, then, the environmental objects cannot be recognized based on the acquired images, and hence the accumulative errors generated by the dead reckoning sensors cannot be mitigated by the visual SLAM algorithm.

The unqualified image ratio refers to a ratio between the number of unqualified images acquired during a specific time duration and the total number of images acquired during the specific time duration. For example, if one image is acquired and processed every 300 ms, and the set time duration is 6 s, then within 20 images acquired and processed within the closest forward 6 s from the present time, if there are 19 images that meet the criterion of "if the number of image features extracted from the acquired image is smaller than the predetermined number" (referred to as unqualified images), then the unqualified image ratio is 19/20, i.e., 95%. The method for determining whether an image is unqualified may be any other suitable method derived by a person having ordinary skills in the art based on the above-disclosed method. For example, the method may be based on a ratio between the number of image features extracted from the image and all pixels of the image. If the predetermined unqualified image ratio is set to be 90%, then under this condition, the unqualified image ratio is greater than the predetermined unqualified image ratio. As such, the image capturing device may be determined to be in the suspected ineffective state. In some embodiments, the predetermined unqualified image ratio may be set as 0. In other words, in the algorithm, only when all of the 20 images within the 6 s are unqualified, the image capturing device is then determined to be in the suspected ineffective state. The time duration may be other values, such as 1 minute or 3 s, rather than 6 s. A person having ordinary skills in the art can conceive that a determination method based on an unqualified image ratio being smaller than a predetermined unqualified image ratio to determine whether the image capturing device is in the suspected ineffective state, which is not repeated.

In a second method, the captured images are processed to remove noise. After the noise is removed, the autonomous mobile device may determine whether the image contrast ratio between the brightest pixel and the darkest pixel in the same image is lower than a predetermined contrast ratio. Based on a determination that the image contrast ratio between the brightest pixel and the darkest pixel in the same image is lower than a predetermined contrast ratio, the autonomous mobile device may determine that the image capturing device is in the suspected ineffective state.

It has also been mentioned in the above descriptions that another reason for the camera to be in the "suspected ineffective state" is: although the camera is not malfunctioning, the external light may be too bright or too dark, exceeding the recognizable range of the feature information included in the images captured by the camera. As a result, the images may lack the feature information that may be used for localization and mapping, and hence the images may not be useful. Accordingly, the camera may be in the suspected ineffective state. Corresponding to this reason, when determining whether the camera is in the suspected ineffective state, after the captured images are processed to remove noise, the autonomous mobile device may obtain the image contrast ratio between the brightest pixel and the darkest pixel in the same image. If the autonomous mobile device determines that the image contrast ratio is lower than the predetermined contrast ratio, in other words, if the recognizable feature information in the image is too little, the autonomous mobile device may determine that the image capturing device is in the suspected ineffective state.

In a third method, if a same image feature is extracted from multiple captured images, the multiple images may be sorted in the chronological order based on the time instances at which the images are captured to form an image sequence. The same image feature may correspond to a feature of a same object in the environment (e.g., a specific corner of a specific table), which may be a feature point of the same object captured from different angles and/or different distances. If the movement trajectory of the same image feature extracted from the image sequence does not match with an estimate motion state provided by the dead reckoning sensors and/or the motion unit of the autonomous mobile device, then, the autonomous mobile device may determine that the image capturing device is in the suspected ineffective state. The estimated motion state refers to a motion state (e.g., a motion state including one or more motion parameters such as pose, linear velocity, angular velocity, etc.) calculated based on the motion parameters obtained by various dead reckoning sensors and/or motion unit and based on a VSLAM algorithm. The estimated motion state may be close to the actual motion state. However, due to the errors of the sensors, errors introduced by the algorithm, and the inevitable accumulative errors of the dead reckoning sensors, there may be a deviation between the estimate motion state and the actual motion state. Despite the deviation, the estimated motion state can still be a close approximation of the actual motion state.

In another embodiment of the present disclosure, the autonomous mobile device may compare multiple images captured by the camera. If the feature points on the multiple images do not change (or remain the same), and the inertial measurement unit ("IMU"), encoders, and wheel assembly of the autonomous mobile device all operate normally, then, the autonomous mobile device may determine that the camera is in the suspected ineffective state. The feature points on the multiple image may be determined to remain the same when the feature points do not change relative to the objects in the environment, and the number of feature points in the images and the relative positional relationship between multiple feature points representing multiple objects in the images do not change. An encoder may also be referred to as a wheel encoder, which is a digital encoder for measuring the displacement of the autonomous mobile device. The encoder is a device configured for transforming certain physical quantity into a digital format, and may be any suitable type based on principles of electrical contact, magnetic effect, capacitive effect, and opto-electrical conversion, etc. The encoder has the advantages of a strong discernability, high measurement precision, and high work reliability, etc. There are two primary types of encoders, the grating type and the optical flow type (similar to the optical flow sensor for detecting the moving direction and displacement of an optical mouse).

It should be noted that the above dead reckoning sensors may include IMUs and/or encoders. The IMU may include at least one of a gyroscope or an accelerometer. The motion unit may include the wheel assembly.

In an embodiment of the present disclosure, the sensing device may include a distance measuring device (e.g., Lidar sensor). When the step S110 is executed, the method may specifically include: moving in the work environment, and obtaining distance information acquired by the distance measuring device. The distance information may include a distance between the autonomous mobile device and an object in the work environment (e.g., an obstacle).

In some embodiments of the present disclosure, the step S120 may include the following two methods for determining whether the distance measuring device is in the suspected ineffective state:

In a first method, the data provided by a dead reckoning sensor of the autonomous mobile device indicate that the wheel assembly of the autonomous mobile device is operating normally, but the distance information acquired by the distance measuring device does not change within a predetermined time duration, or the change is within a predetermined threshold range, the autonomous mobile device may determine that the distance measuring device is in the suspected ineffective state.

As described above, one of the reasons for the distance measuring device to be in the suspected ineffective state is: the distance measuring device detects that the distance between the autonomous mobile device and a surrounding obstacle does not change, or the change is small, and the wheel assembly is still rotating. The slip of the wheel assembly may have caused the autonomous mobile device to experience no actual displacement. As a result, the autonomous mobile device may be unable to determine whether itself is in the stranded situation based on the information provided by the sensing device, other sensors, and the mileage data provided by the encoders. The distance measuring device may have become ineffective. Based on this reason, when determining whether the distance measuring device is in the suspected ineffective state, the first method described in the preceding paragraph may be used for the determination.

In a second method, based on a determination that the distance measuring device does not receive recognizable light within a second predetermined time duration, the autonomous mobile device may determine that the distance measuring device is in the suspected ineffective state. Based on a determination that the distance measuring device has not received the recognizable light for an extended time duration, the autonomous mobile device may determine that the distance measuring device is in the suspected ineffective state.

In some embodiments, prior to executing the step S160 "executing escape instructions," the autonomous mobile device may detect or determine a continuous time duration in which the sensing device is in the suspected ineffective state, and compare the continuous time duration with a third predetermined time duration. Based on a determination that the continuous time duration in which the sensing device is in the suspected ineffective state exceeds the third predetermined time duration, step S160 may be executed (i.e., the escape instructions may be executed).

In some embodiments, the step S1602 may be implemented through the following method: using a second predetermined distance as the radius, and using a predetermined location as the center of a circle, determining a target trajectory circular arc. The predetermined location may be located in a zone in front of the stranded location, on a side of the stranded location, or at any suitable location or direction where the autonomous mobile device is no longer in the stranded situation. The autonomous mobile device may move along the target trajectory circular arc for a third predetermined distance, or move along the target trajectory circular arc for an angle to a location on the arc where a tangent chord angle is equal to the second predetermined angle.

In some embodiments, as shown in FIG. 2A, the escape instructions, when executed, may cause the autonomous mobile device to perform the following functions or operations: moving backwardly for a first predetermined distance L1 until arriving at the location B. The first predetermined distance L1 may be a specific distance value, such as 0.5 meter, or may be a ratio set based on the size of the autonomous mobile device or a component of the autonomous mobile device. For example, if the autonomous mobile device has a left-right symmetrical structure, the distance between the rear middle portion and the front middle portion may be defined as a longitudinal size, then the first predetermined distance may be 2 times of the longitudinal size. If the longitudinal size is 0.4 meter, then the first predetermined distance obtained based on the above ratio is 0.8 meter. The escape instructions, when executed, may cause the autonomous mobile device to perform the following functions or operations: using the predetermined location O as the center of a circle, using the second predetermined distance OB as the radius, determining a segment BC, which is a target trajectory circular arc BC. The predetermined location O is located at a zone in from of the present or current location of the autonomous mobile device. The current location of the autonomous mobile device is location B in FIG. 2A, the zone in front of the location B refers to a zone above the location B in FIG. 2A. The segment OB is greater than the first predetermined distance L1, i.e., the distance between the two locations A and B. The autonomous mobile device may move along the target trajectory circular arc BC for a third predetermined distance, from location B to location C. In this embodiment, the third predetermined distance is the arc length. The present disclosure does not exclude other embodiments in which the autonomous mobile device moves along a straight line or a folded line, or other non-circular arc. As a result, the autonomous mobile device moves around the location A shown in FIG. 2A, where the autonomous mobile device detects a stranded situation. In another embodiment, as shown in FIG. 2B, the autonomous mobile device may move along the target trajectory circular arc BC for a tangent chord angle that equals to the second predetermined rotation angle θ2. The detailed implementation may refer to the following method: from the tangent line BD that passes the location B, rotating around the location B in the counter-clockwise direction for a tangent chord angle that is the second predetermined rotation angle θ2; drawing a straight line passing the location B along the second predetermined rotation angle θ2, and determining the crossing point C between the straight line and the target trajectory circle; moving along the target trajectory circular arc BC from the location B to the location C. The angle θ2 may or may not be equal to θ shown in FIG. 2A.

Through the above steps and the configuration or setting of the target trajectory circular arc, and by moving along the target trajectory circular arc, from the location B that is away from the location A (the stranded location), at an even further distance away from the location A and at an even larger angle, the likelihood for the autonomous mobile device to circumvent the location A is increased.

In other embodiments of the present disclosure, after the autonomous mobile device moves backwardly for the first predetermined distance L1 to the location B, the escape instructions, when executed, may also cause the autonomous mobile device to perform the following functions or operations: moving along a curve, or a folded line, to circumvent the stranded location.

Figure 3:
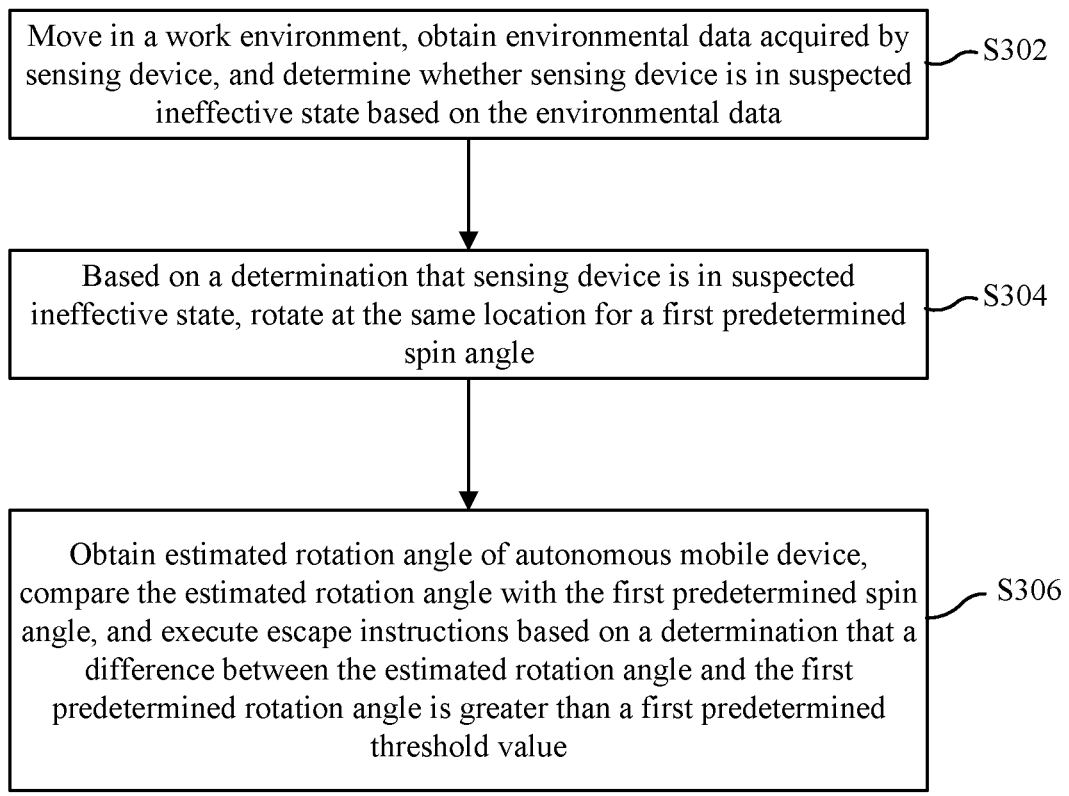
FIG. 3 is a flowchart illustrating an escape method executable by an autonomous mobile device when the autonomous mobile device moves along a curve, according to another embodiment of the present disclosure.

FIG. 3 is a flowchart illustrating another escape method for the autonomous mobile device, according to another embodiment of the present disclosure. As shown in FIG. 3, the method may include the following steps:

Step S302: moving in the work environment, and obtaining environmental data acquired by the sensing device of the autonomous mobile device. The autonomous mobile device may determine, based on the environmental data, whether the sensing device is in a suspected ineffective state. The suspected ineffective state refers to a state in which the autonomous mobile device is unable to determine whether it is in the stranded situation based on the feedback information provided by the sensing device carried by the autonomous mobile device.

Step S304: based on a determination that the sensing device is in the suspected ineffective state, rotating at the same location (i.e., rotating relative to central vertical axis of itself) for the first predetermined spin angle.

Step S306: obtaining an estimated rotation angle of the autonomous mobile device based on one or more motion parameters acquired by a dead reckoning sensor, and comparing the estimated rotation angle with the first predetermined spin angle. Based on a determination that a difference (which may be an absolute value) between the estimated rotation angle and the first predetermined angle is greater than a first predetermine threshold value, executing escape instructions. The escape instructions, when executed, may cause the autonomous mobile device to perform the following functions or operations: moving backwardly for a first predetermined distance; and moving along a curve, or along a folded line, to circumvent the stranded location.

It should be noted that description of the embodiment shown in FIG. 3 can refer to the above descriptions of the embodiment shown in FIG. 1, which are omitted.

Figure 4:
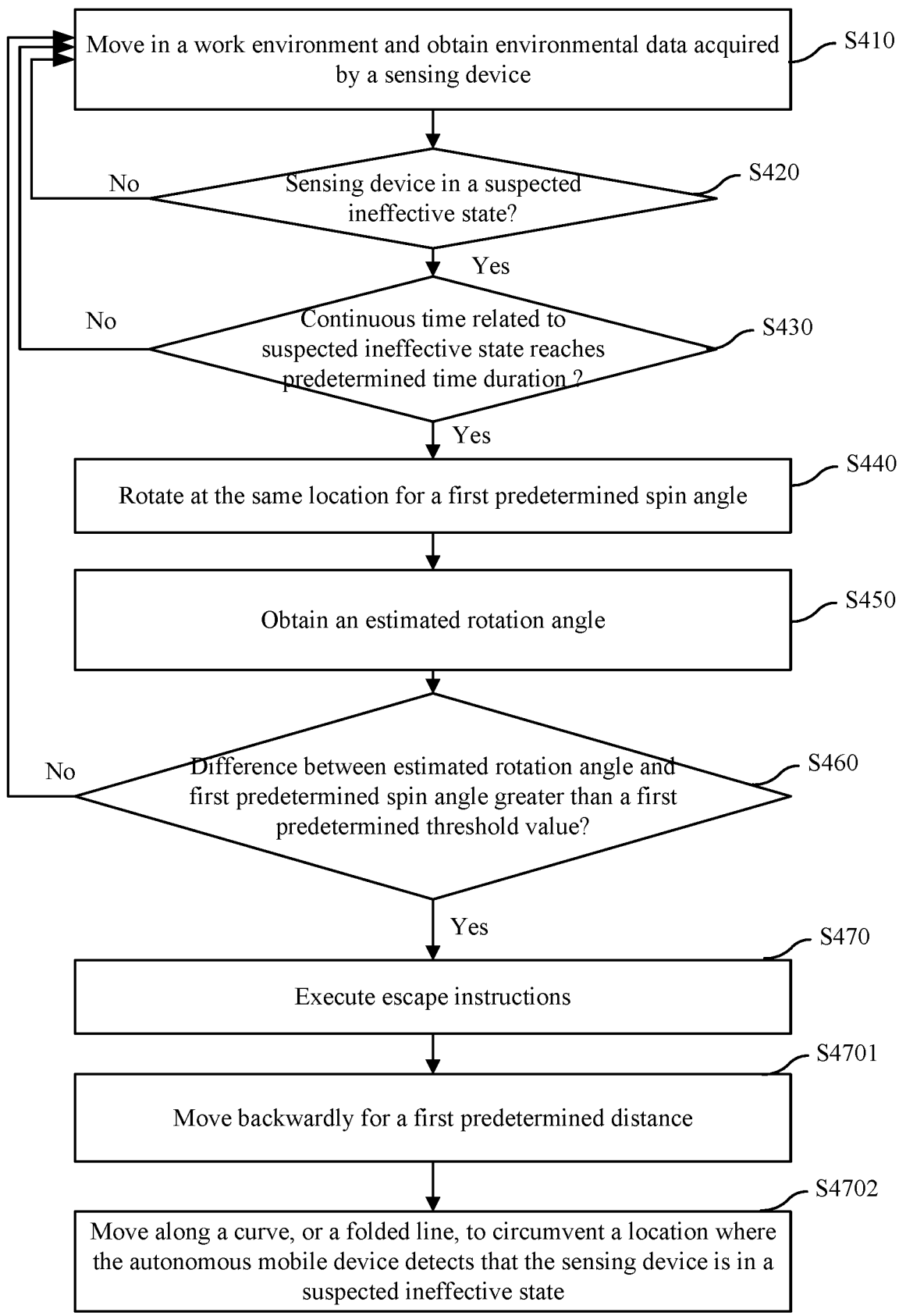
FIG. 4 is a flowchart illustrating an escape method executable by an autonomous mobile device when the autonomous mobile device moves along a curve, according to another embodiment of the present disclosure.

FIG. 4 is a flowchart illustrating another escape method for the autonomous mobile device, according to another embodiment of the present disclosure. As shown in FIG. 4, the method may include the following steps:

Step S410: moving in the work environment, and obtaining the environmental data acquired by the sensing device of the autonomous mobile device.

Step S420: determining whether the sensing device is in a suspected ineffective state based on the environmental data acquired by the sensing device of the autonomous mobile device. Based on a determination that the sensing device is in the suspected ineffective state (Yes, step S420), executing step S430; otherwise (No, step S420), executing the step S410.

Step S430: determining a continuous time duration in which the sensing device is in the suspected ineffective state, and comparing the continuous time duration relating to the suspected ineffective state with a third predetermined time duration. Based on a determination that the continuous time duration is greater than the third predetermined time duration (Yes, step S430), executing step S440; otherwise (No, step S430), executing step S410.

Step S440: rotating at the same location (i.e., spinning around a central vertical axis of the autonomous mobile device itself) for the first predetermined spin angle.

Step S450: obtaining an estimated rotation angle of the autonomous mobile device based on one or more motion parameters acquired by a dead reckoning sensor.

Step S460: comparing the estimated rotation angle of the autonomous mobile device with the first predetermined spin angle. Based on a determination that a difference (which may be an absolute value) is greater than the first predetermined threshold value (Yes, step S460), executing step S470; otherwise (No, step S460), executing step S410.

Step S470: executing escape instructions; the escape instructions, when executed, may cause the autonomous mobile device to perform the following functions or operations:

Step S4701: moving backwardly for the first predetermined distance. The backward movement is in a direction opposite to the current heading direction of the autonomous mobile device.

Step S4702: moving along a curve, or a folded line, to circumvent the location where the autonomous mobile device detects that the sensing device is in the suspected ineffective state, i.e., the stranded location. The stranded location may be the location A shown in any of FIGS. 2A-2F.

Figure 5:
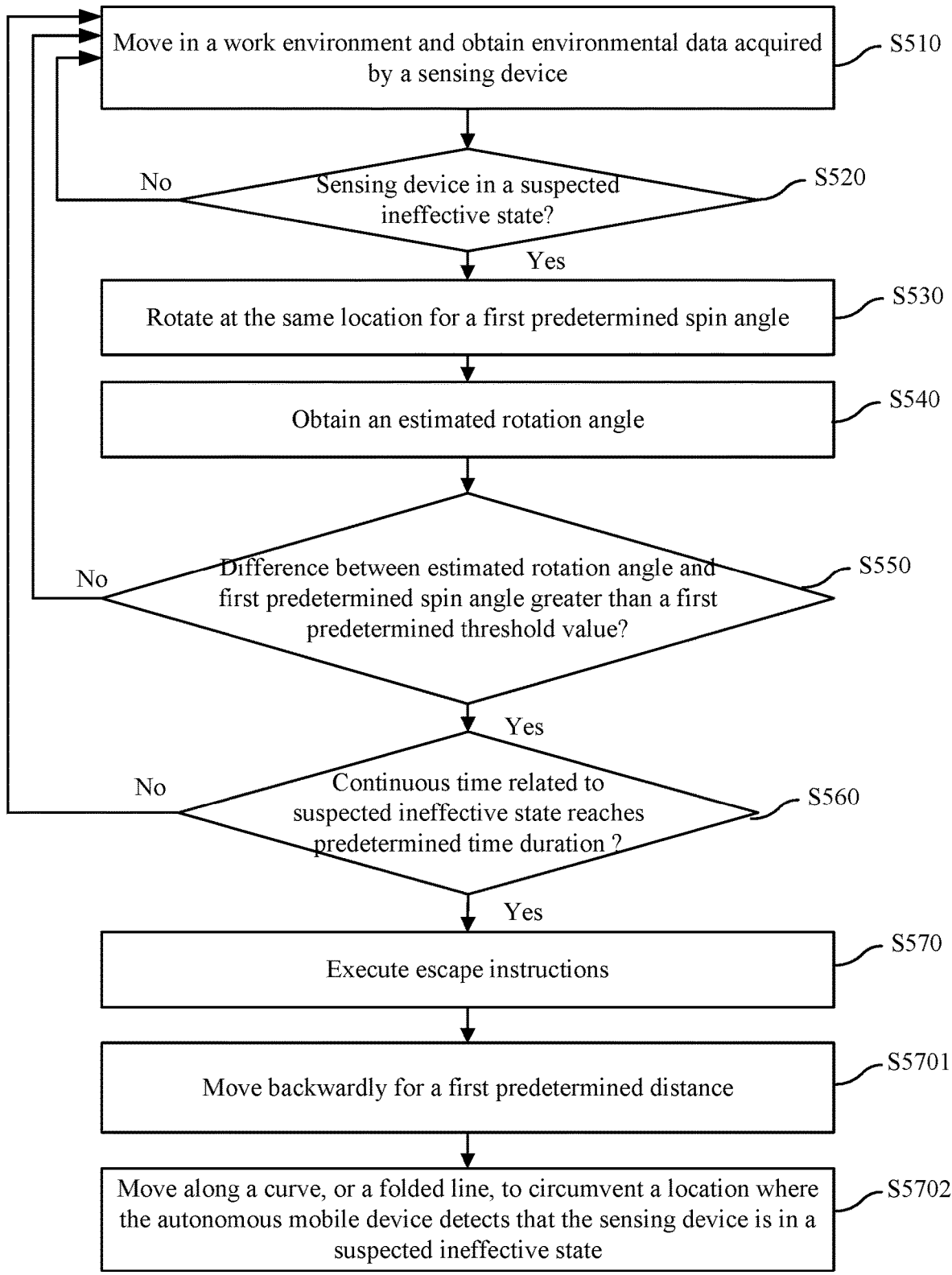
FIG. 5 is a flowchart illustrating an escape method executable by an autonomous mobile device when the autonomous mobile device moves along a curve, according to another embodiment of the present disclosure.

FIG. 5 is a flowchart illustrating another escape method for the autonomous mobile device, according to another embodiment of the present disclosure. As shown in FIG. 5, the method may include the following steps:

Step S510: moving in the work environment, and obtaining environmental data acquired by the sensing device of the autonomous mobile device.

Step S520: determining whether the sensing device is in the suspected ineffective state based on the environmental data acquired by the sensing device. Based on a determination that the sensing device is in the suspected ineffective state (Yes, step S520), executing step S530; otherwise (No, step S520), executing step S510.

Step S530: rotating at the same location (i.e., spinning around a central vertical axis of the autonomous mobile device itself) for the first predetermined spin angle.

Step S540: obtaining the estimated rotation angle based on one or more motion parameters acquired by a dead reckoning sensor, e.g., an IMU (such as a gyroscope) or encoders.

Step S550: comparing the estimated rotation angle of the autonomous mobile device with the first predetermined spin angle. Based on a determination that a difference (which may be an absolute value) between the two angles exceeds the first predetermined threshold value (Yes, step S550), the executing step S560; otherwise (No, step S550), executing step S510.

Step S560: determining a continuous time duration during which the sensing device is in the suspected ineffective state, and comparing the continuous time duration relating to the suspected ineffective state with the third predetermined time duration. Based on a determination that the continuous time duration in which the sensing device is in the suspected ineffective state is greater than the third predetermined time duration (Yes, step S560), executing step S570; otherwise (No, step S560), executing step S510.

Step S570: executing escape instructions; the escape instructions, when executed, may cause the autonomous mobile device to perform the following functions or operations:

Step S5701: moving backwardly for the first predetermined distance. The backward movement is from a stranded location in a direction opposite to the current heading direction at the stranded location.

Step S5702: moving along a curve, or a folded line, to circumvent the location where the autonomous mobile device detects that the sensing device is in the suspected ineffective state, i.e., the stranded location.

The escape methods shown in FIG. 4 and FIG. 5 for the autonomous mobile device differ from the escape method shown in FIG. 1 in that: the escape methods shown in FIG. 4 and FIG. 5 include a triggering condition for executing the escape instructions. The triggering condition is: determining whether the continuous time duration, in which the sensing device of the autonomous mobile device is in the suspected ineffective state, is greater than (i.e., exceeds) a predetermined time duration (the third predetermined time duration). It should be noted that this determination may be performed before executing instructions for detecting the suspected ineffective state, or after the instructions for detecting the suspected ineffective state are executed. The instructions for detecting the suspected ineffective state may include: rotating at the same location for the first predetermined spin angle, obtaining the estimated rotation angle of the autonomous mobile device based on one or more motion parameters acquired by a dead reckoning sensor, and comparing the estimated rotation angle of the autonomous mobile device with the first predetermined spin angle. The present disclosure does not limit the order of execution of these instructions.

In addition, descriptions of the embodiments shown in FIG. 4 and FIG. 5 may refer to the descriptions of the embodiment shown in FIG. 1, which are not repeated.

Figure 6:
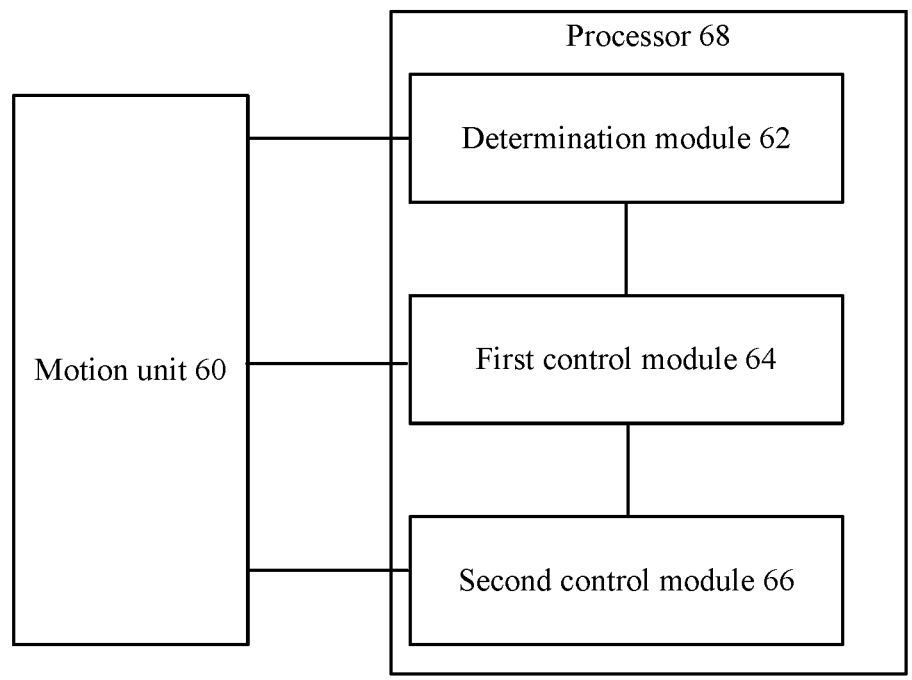
FIG. 6 is a schematic illustration of a structure of a control apparatus of an autonomous mobile device, according to an embodiment of the present disclosure.

FIG. 6 is a schematic illustration of the structure of a control apparatus of the autonomous mobile device. The control apparatus may also be referred to as an escape apparatus. As shown in FIG. 6, the control apparatus includes:

A motion unit 60, configured to drive the autonomous mobile device to move in the work environment. The motion unit 60 may include the wheel assembly (such as at least two wheels and two or more motors). In some embodiments, the motion unit 60 may also include control circuits and program codes implementing various controls.

A determination module 62, configured to obtain environmental data acquired by the sensing device of the autonomous mobile device, and determine, based on the environmental data, whether the sensing device is in the suspected ineffective state. The suspected ineffective state refers to a state in which the autonomous mobile device is unable to determine whether it is in a stranded situation based on the feedback information provided by the sensing device of the autonomous mobile device.

A first control module 64, configured to control the wheel assembly such that the autonomous mobile device rotates at the same location for the first predetermined spin angle after it is determined that the sensing device is in the suspected ineffective state.

A second control module 66, configured to obtain an estimated rotation angle of the autonomous mobile device based on one or more motion parameters acquired by a dead reckoning sensor, and compare the estimated rotation angle with the first predetermined spin angle. Based on a determination that a difference between the estimated rotation angle and the first predetermined spin angle is greater than the first predetermined threshold value, the second control module 66 may execute the escape instructions. The escape instructions, when executed, may cause the autonomous mobile device to perform the following functions or operations: moving backwardly for the first predetermined distance; and moving along a curve or a folded line to circumvent the stranded location. It is noted that the determination module 62, the first control module 64, and the second control module 66 may be included in a processor 68 of the autonomous mobile device as software (e.g., computer codes), hardware (including circuits, gates, etc.), or a combination thereof. The processor 68 may also be referred to as a controller 68.

It should be noted that descriptions of the embodiment shown in FIG. 6 can refer to the relevant descriptions of the embodiment shown in FIG. 1, which are not repeated.

Figure 7:
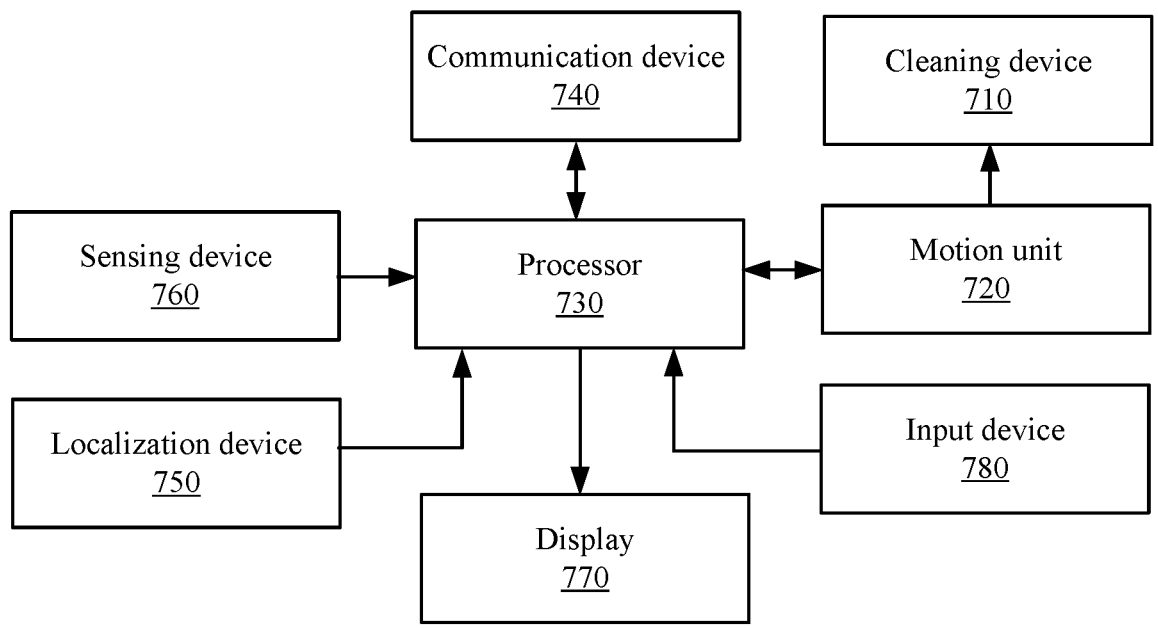
FIG. 7 is a schematic illustration of a cleaning robot, according to an embodiment of the present disclosure.

FIG. 7 is a schematic illustration of a cleaning robot 700, according to an embodiment of the present disclosure. As shown in FIG. 7, the cleaning robot 700 may include: a cleaning device 710, a motion unit 720, and a processor 730. The processor 730 may be an embodiment of the processor 68 shown in FIG. 6.

The motion unit 720 may be connected with the processor 730, and may be configured to drive the cleaning robot to move under the control of the processor 730. The motion unit 720 may be an embodiment of the motion unit 60 shown in FIG. 6.

The processor 730 may be configured to execute the escape methods disclosed herein. The processor 730 may be connected with the various components included in the cleaning robot 700, and may receive data from various components. In addition, the processor 730 may process the data received from the various components, and transmit control commands to the various components. The connections shown in FIG. 7 between the processor 730 and various components included in the cleaning robot 700 are for illustrative purposes.

The cleaning device 710 may be configured to clean a surface of a floor that the motion unit 720 passes by. The cleaning device 710 may include any one or combination of a vacuum cleaning unit, a floor sweeping unit, or a floor mopping unit, etc.

The cleaning robot 700 may also include: a communication device 740, a localization device 750, and a sensing device 760.

The localization device 750 may be configured to acquire location data (or position data). The sensing device 760 may be an image capturing device configured to acquire image data, or a distance measuring device configured to measure distances between the autonomous mobile device and surrounding objects. Specifically, in some embodiments, the localization device 750 may be one or more of an odometer or an IMU. In some implementation, to increase the accuracy of locating the cleaning robot 700, the cleaning robot 700 may also include one or more ultrasonic sensors.

The communication device 740 may be connected with a user terminal through a wireless network, and may transmit the environmental map of a region to the user terminal for display. The communication device 740 may transmit to the processor 730 the pose of the cleaning robot 700 set by a user that is received from the user terminal.

The processor 730 may be configured to correct or adjust the pose of the cleaning robot 700 that is set by the user, to obtain the pose of the cleaning robot 700 in the environmental map of the region.

In some embodiments, the cleaning robot 700 may also include: a display 770 and an input device 780.

The display 770 may be configured to display the environmental map of the region.

The input device 780 may be configured to receive the pose of the cleaning robot 700 set by the user based on the environmental map of the region.

The present disclosure also provides a non-transitory computer-readable storage medium. The non-transitory computer-readable storage medium may store programs, which when executed, control a device (e.g., a controller or processor) where the non-transitory computer-readable medium is located, embedded, or otherwise electrically coupled with, to execute the methods for the autonomous mobile device to escape from a stranded situation.

The storage medium may be configured to store programs configured to cause an autonomous mobile device to perform at least one of the following functions: moving in the work environment; obtaining the environmental data acquired by the sensing device of the autonomous mobile device; and determining whether the sensing device is in the suspected ineffective state based on the environmental data; the suspected ineffective state refers to a state in which the autonomous mobile device is unable to determine whether it is in the stranded situation based on the feedback information provided by the sensing device of the autonomous mobile device; based on a determination that the sensing device is in the suspected ineffective state, rotating at the same location for the first predetermined spin angle; obtaining an estimated rotation angle of the autonomous mobile device based on one or more motion parameters acquired by a dead reckoning sensor, and comparing the estimated rotation angle with the first predetermined spin angle; based on a determination that a difference between the estimated rotation angle and the first predetermined spin angle is greater than the first predetermined threshold value, executing the escape instructions; the escape instructions, when executed, may cause the autonomous mobile device to perform the following functions or operations: moving backwardly for the first predetermined distance; and moving along a curve or a folded line to circumvent the stranded location.

The present disclosure also provides a processor. The processor is configured to execute the programs. When the programs are executed, the escape methods are performed.

The processor may be configured to execute programs that can provide the following functions: moving in the work environment, and obtaining environmental data acquired by the sensing device; determining, based on the environmental data, whether the sensing device is in the suspected ineffective state; the suspected ineffective state refers to a state in which the autonomous mobile device is unable to determine whether itself is in the stranded situation based on the feedback information provided by the sensing device of the autonomous mobile device; based on a determination that the sensing device is in the suspected ineffective state, rotating at the same location for the first predetermined spin angle; obtaining an estimated rotation angle based on one or more motion parameters acquired by a dead reckoning sensor, and comparing the estimated rotation angle with the first predetermined spin angle. based on a determination that a difference between the estimated rotation angle and the first predetermined spin angle is greater than the first predetermined threshold value, executing the escape instructions. The escape instructions, when executed, may cause the autonomous mobile device to perform the following functions or operations: moving backwardly for the first predetermined distance; and moving along a curve or a folded line to circumvent the stranded location.

Figure 8:
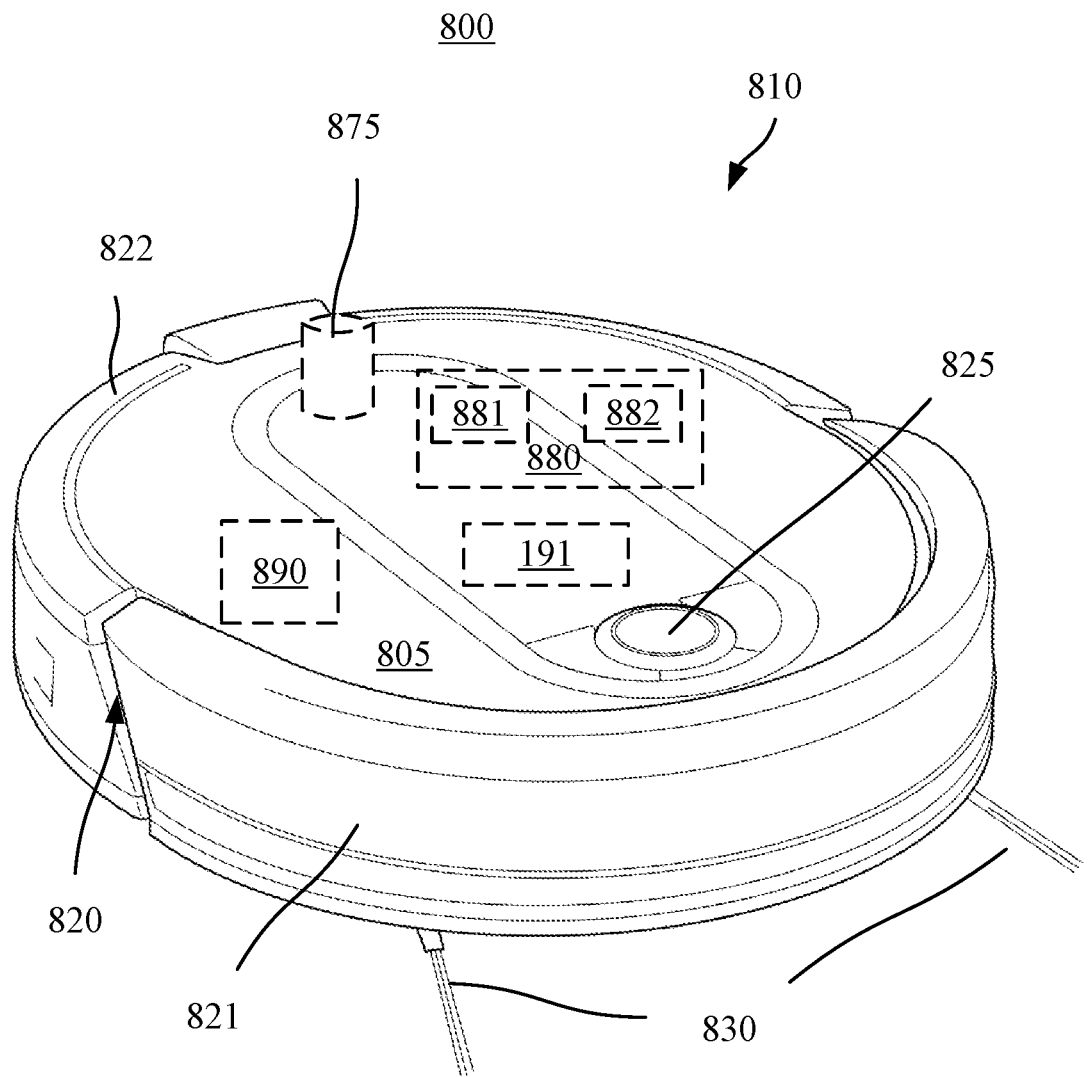
FIG. 8 is a schematic perspective view of an autonomous mobile device, according to an embodiment of the present disclosure.

FIG. 8 schematically illustrates a perspective view of an autonomous mobile device 800, according to an embodiment of the present disclosure. The autonomous mobile device 800 may be an embodiment of the autonomous mobile device described above and illustrated in other figures. The autonomous mobile device 800 also be referred to as a mobile device 800, a cleaning device 800, a vacuum cleaner 800, a vacuum cleaning robot 800, a sweeping-mopping robot 800, or a cleaning robot 800. The autonomous mobile device 800 may include a main body 810. The main body 810 may have any suitable shape, such as a circular shape (as shown in FIG. 8), a rectangle shape, a square shape, an oval shape, or a combination thereof. The main body 810 may include an exterior housing (or referred to as a housing) 805 for enclosing and accommodating various elements, parts, or components of the autonomous mobile device 800. The main body 810 (or the housing 805) may include a first bumper (or first cover, front bumper) 821 and a second bumper (or second cover, rear bumper) 822 at a circumferential side of the main body 810. The first bumper 821 may be separated from the second bumper by one or more gaps 820. At least one of the first bumper 821 or the second bumper 822 may be resiliently coupled with the housing 805 or another part of the main body 810 through an elastic member, such as a spring (not shown). When the autonomous mobile device 800 collides with an obstacle, such as a wall or furniture, the first bumper 821 or the second bumper 822 may retract when pushed by the obstacle, thereby providing a buffer or an impact absorption for the autonomous mobile device 800. One or more collision sensors may be disposed at the first bumper 821 and/or the second bumper 822. When the first bumper 821 and/or the second bumper 822 collides with an object, the one or more collision sensors may detect the collision and generate a signal indicating the occurrence of the collision. In some embodiments, the collision sensor may detect a potential collision and generate a warning signal, or trigger a controller (such as a processor 890) to make a collision avoidance control. For example, the processor 890 may control the operation of the autonomous mobile device 800 to stop the autonomous mobile device 800 or change the moving direction of the autonomous mobile device 800 to avoid the collision. The autonomous mobile device 800 may also include a sensing device configured to acquire environmental data of a work environment in which the autonomous mobile device 800 moves or operates. The sensing device may include at least one of a camera 825 or a distance measuring device 875. The camera 825 may be configured to capture one or more images of the environment in which the autonomous mobile device 800 moves. For illustrative purposes, the camera 825 is shown as being mounted at the front portion (e.g., behind a protective cover disposed at the front bumper 821) of the autonomous mobile device 800. It is understood that the camera 825 may be mounted at any other location of the autonomous mobile device 800, e.g., a top portion of the housing, a side portion, a back portion, etc. The orientation of the camera 825 may be in any suitable directions, such as facing front, facing back, facing sides, facing up (e.g., ceiling of a room), facing a direction forming an acute angle relative to the moving direction of the cleaning device, etc. In some embodiments, two or more cameras may be disposed at various portions of the autonomous mobile device 800. In some embodiments, the facing direction of each camera may be adjustable through a manual adjustment or an electrical adjustment. In some embodiments, the facing direction of a camera may be fixed. In some embodiments, the camera 825 may capture an image of the environment in which the autonomous mobile device 800 operates.

The autonomous mobile device 800 may include the processor 890. The processor 890 may be a controller. The processor 890 may be an embodiment of any processor described herein or illustrated in other figures. The processor 890 may be any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. The processor 890 may be implemented as software, hardware, firmware, or a combination thereof.

The processor 890 may perform various control functions controlling the operations of various components of the autonomous mobile device 800. The processor 890 may process data and/or signals received by the autonomous mobile device 800. The processor 890 may control the autonomous mobile device 800 to move to circumvent a location where the processor determines that the autonomous mobile device 800 is in a stranded situation.

The autonomous mobile device 800 may include a data storage device 891 configured to store data, signals, images, processor-executable instructions or codes, etc. The data storage device 891 may also be referred to as a non-transitory computer-readable medium. The non-transitory computer-readable medium may be any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc. The processor 890 may store data into the data storage device 891, or retrieve data from the data storage device 891.

The autonomous mobile device 800 may include a communication device 880 configured to communicate with another device, such as a cloud server, a docking station, a smart phone, another similar autonomous mobile device, etc. The communication device 880 may include a receiver 881 configured to receive data or signals from another device, and a transmitter 882 configured to transmit data or signals to another device. In some embodiments, the receiver 881 and the transmitter 882 may be an integral transceiver. The autonomous mobile device 800 may further include one or more cleaning devices, such as one or more brushes. For illustrative purposes, FIG. 8 shows two side brushes 830.

In some embodiments, the autonomous mobile device 800 may include the distance measuring device 875 configured to measure a distance between the autonomous mobile device 800 and an obstacle. For example, in some embodiments, the sensor 875 may be a laser-based distance measuring device, such as Light Detection and Ranging ("Lidar") sensor.

Figure 9:
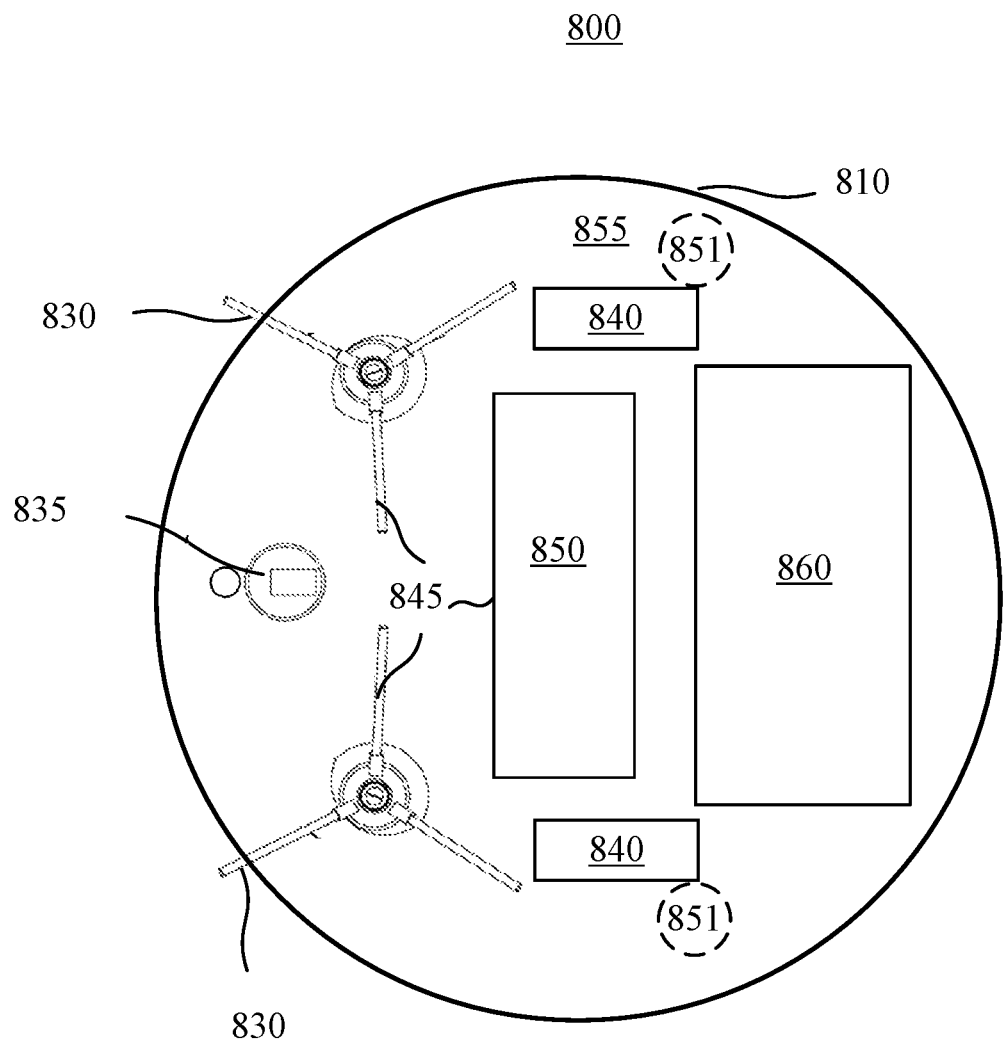
FIG. 9 is a schematic bottom view of an autonomous mobile device, according to an embodiment of the present disclosure.

FIG. 9 is a schematic illustration of a bottom view of the structural configuration of the autonomous mobile device 800, according to an embodiment of the present disclosure. Elements or structures shown in the bottom view are based on the autonomous mobile device 800 being a cleaning device. When the autonomous mobile device 800 is another type of device, the elements and structures may be different. The bottom of the main body 810 of the autonomous mobile device 800 may include a bottom surface or plate 855. In some embodiments, the bottom surface 855 may be formed by a plurality of surfaces, although for illustrative purposes, the bottom surface 855 is shown as a single piece. A sweeping unit 845 may be mounted to the bottom surface 855. The sweeping unit 845 may include the side brushes 830 and a main brush 850 disposed at a relatively center location of the bottom surface 855. The side brushes 830 and/or the main brush 850 may be mounted to the bottom surface 855, or may be mounted to other components inside the autonomous mobile device 800 and may extend out of the housing through an opening provided at the bottom surface 855. Although not shown, in some embodiments, the main brush 850 may be configured to sweep dirt or trash into a trash storage tank disposed inside the autonomous mobile device 800, at a top portion, or a side portion of the autonomous mobile device 800, or to sweep dirt or trash such that they may be vacuumed into a vacuum port.

The autonomous mobile device 800 may include a motion mechanism (or motion unit) configured to enable the autonomous mobile device 800 to move along a surface (e.g., a floor, a ground). The motion mechanism may include a wheel assembly. The wheel assembly may include an omnidirectional wheel 835 disposed at a front portion of the bottom surface 855. The omnidirectional wheel 835 may be a non-driving, passively rotating wheel. The wheel assembly may also include at least two driving wheels 840 disposed at two sides (e.g., left and right sides) of the bottom surface 855. The positions of the omnidirectional wheel 835 and the two driving wheels 840 may form a triangle, as shown in FIG. 9, to provide a stable support to the main body 810 of the autonomous mobile device 800. In some embodiments, the driving wheels 840 may be rotatable around a rotation axis passing through a center of symmetry of the driving wheels 840. In some embodiments, the driving wheels 840 may not be rotatable around an axis perpendicular to the bottom surface 855. The omnidirectional wheel 835 may freely rotate around an axis perpendicular to the bottom surface 155, and around an axis passing through a center of symmetry of the omnidirectional wheel 835. The omnidirectional wheel 835 and the driving wheels 840 together move the autonomous mobile device 800 in any desirable direction. The at least two driving wheels 840 may be independently driven by at least two electric motors 851 disposed inside the main body 810. Although two motors 851 are shown for illustrative purposes, in some embodiments, the at least two driving wheels 840 may be driven by a single motor. The motors 851 are parts of the motion mechanism. When the two driving wheels 840 are driven at different speeds, the rotation speed differential of the driving wheels 840 may cause the mobile device 800 to turn (i.e., spin at the same location or rotate while moving forward). In some embodiments, the driving wheels 840 may be rotatable also around an axis perpendicular to the bottom surface 855.

In some embodiments, the autonomous mobile device 800 may include a mopping mechanism 860 disposed at the bottom surface 855. The mopping mechanism 860 may include at least one movable mopping plate attached with a mop to mop the surface to be cleaned (e.g., a floor). For illustrative purposes, the mopping mechanism 860 is shown as a rectangle in FIG. 9. The mopping mechanism 860 may have any suitable shapes, such as a round shape, a square shape, a triangle shape, or a portion or a combination thereof. When the autonomous mobile device 800 is another type of cleaning device, the mopping mechanism 860 may be replaced by another suitable type of cleaning mechanism. The processor 890 shown in FIG. 8 may control various components of the autonomous mobile device 800, including the motion mechanism (or motion unit), and the sweeping unit 845, and the mopping mechanism 860. In some embodiments, the motion mechanism, the sweeping unit 845, and the mopping mechanism 860 may share motors. In some embodiments, the motion mechanism, the sweeping unit 845, and the mopping mechanism 860 may be independently driven by separate motors. In some embodiments, when the autonomous mobile device 800 is equipped with the vacuum function instead of the mopping function, the element 860 may be a vacuum port.

The sequence of the embodiments is for description purposes only, and does not imply which one is a better embodiment.

In the above descriptions, various embodiments are described with focus on various aspects. If certain aspects are not described in detail for a certain embodiment, such descriptions can refer to the relevant descriptions for other embodiments.

It should be understood from the above embodiments that the technical solutions of the present disclosure may be implemented through other manners. The above descriptions of the device embodiments are for illustrative purposes. For example, the division of the units or modules in the device embodiments may be a division from the perspective of logic functions. Other divisions may be implemented in practice. For example, multiple units or assemblies may be combined or integrated into another system. Some features may be omitted or may not be executed. In addition, the direct coupling or communication connection between various elements as illustrated or described may be implemented as indirect coupling or communication connection through other interfaces, units, or modules. The coupling may be electrical, electromagnetic, or other forms.

The units that are described as separate elements may or may not be implemented as physically non-separated units. Components that are illustrated as units may or may not be physical units, may be located at one location, or may be distributed in multiple units. Some or all of the units may be selected to implement the technical solutions of the present disclosure based on application needs.

In addition, various functional units in the various embodiments may be integrated in a single processing unit, or may physically exist as independent units. In some embodiments, two or more units may be integrated in a single unit. The integrated units may be implemented as hardware, or may be implemented as software functional units, or both.

When the integrated units are implemented as software functional units and are sold or used as an independent product, the product may be stored in a non-transitory computer-readable storage medium. Based on this understanding, the principal part, or the part that contributes to the existing technology, or some or all parts of the technical solutions of the present disclosure may be implemented as a software product. The computer software product may be stored in a storage medium and may include various instructions, which when executed, cause a computer (which may be a personal computer, a server, or a network device, etc.) to execute some or all of the steps of the methods of the various embodiments. The storage medium may include: a Universal Serial Bus ("USB") drive, a Read-Only Memory ("ROM"), a Random Access Memory ("RAM"), a portable hard disk, a magnetic disk, an optical disk, or any other media that can store program codes.

The embodiments described above are merely some embodiments of the present disclosure. A person having ordinary skills in the art can modify the embodiments without deviating from the principle of the present disclosure. Such modified embodiments also fall within the scope of protection of the present disclosure.

In the present descriptions, terms such as "an embodiment," "a specific embodiment," or "for example" mean that the specific features, structures, materials, or characteristics described in the embodiment or example are included in at least one embodiment or example of the present disclosure. The above-mentioned terms do not necessarily indicate that the embodiments or examples are the same embodiments or examples. In addition, the specific features, structures, materials, or characteristics described herein may be combined in a suitable manner in one or more embodiments or examples. The order of execution of the steps included in various embodiments are merely illustrative for implementing the present disclosure. The order of execution of the steps is not limited by the present disclosure, which can be adjusted in a suitable manner based on application needs.

As used herein, the terms "couple," "coupling," "coupled," "connect," "connection," "connected," or the like may encompass any suitable mechanical, electrical, electromagnetic coupling or connection. The coupling or connection may be wireless or wired. The coupling or connection may be direct or indirect.

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

The term "unit" or "module" may encompass a hardware component, a software component, or a combination thereof. For example, a "unit" or "module" may include a housing, a device, a sensor, a processor, an algorithm, a circuit, an electrical or mechanical connector, etc.

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "non-transitory computer-readable storage medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A method executable by an autonomous mobile device, comprising:
   moving in a work environment;
   obtaining environmental data acquired by a sensing device;
   determining whether the sensing device is in a suspected ineffective state based on the environmental data, the suspected ineffective state being a state in which the autonomous mobile device is unable to determine whether the autonomous mobile device is in a stranded situation based on feedback information provided by the sensing device;
   based on a determination that the sensing device is in the suspected ineffective state, rotating at a same location for a first predetermined spin angle;
   obtaining an estimated rotation angle based on one or more motion parameters acquired by a dead reckoning sensor;
   comparing the estimated rotation angle with the first predetermined spin angle; and
   based on a determination that a difference between the estimated rotation angle and the first predetermined spin angle is greater than a first predetermined threshold value, executing escape instructions,
   wherein the escape instructions, when executed, cause the autonomous mobile device to perform the following operations:
      moving backwardly for a first predetermined distance; and
      moving along a curve to circumvent a stranded location where the autonomous mobile device determines that the sensing device is in the suspected ineffective state,
   wherein moving along the curve includes:
      step S1, controlling a wheel assembly of the autonomous mobile device to drive the autonomous mobile device to move forward while rotating in a second rotation direction for a first predetermined rotation angle;
      step S2, based on a determination that a rotation angle of the autonomous mobile device in the second rotation direction reaches the first predetermined rotation angle, determining a current location of the autonomous mobile device;

step S3, comparing the current location determined in the step S2 with the stranded location, and performing a normal movement based on a determination that at the current location determined in the step S2 the autonomous mobile device circumvents the stranded location, or executing the step S1 or S4 based on a determination that at the current location the autonomous mobile device does not circumvent the stranded location;

step S4, controlling the wheel assembly to drive the autonomous mobile device to move forwardly while rotating in a first rotation direction for a second predetermined rotation angle;

step S5, based on a determination that the rotation angle of the autonomous mobile device in the first rotation direction reaches the second predetermined rotation angle, determining a current location of the autonomous mobile device;

step S6, comparing the current location determined in the step S5 with the stranded location, and performing the normal movement based on a determination that at the current location determined in the step S5 the autonomous mobile device circumvents the stranded location; and based on a determination that at the current location determined in the step S5 the autonomous mobile device does not circumvent the stranded location, repeating execution of the steps S1-S3 or the steps S4-S6, until at the current location determined in the step S5 the autonomous mobile device circumvents the stranded location.

2. The method of claim 1, wherein
the sensing device includes an image capturing device, and
obtaining the environmental data acquired by the sensing device includes obtaining images captured by the image capturing device.

3. The method of claim 2, wherein determining whether the sensing device is in the suspected ineffective state based on the environmental data includes at least one of:
based on a determination that a quantity of image features extracted from the images captured by the sensing device is smaller than a predetermined number, and/or a ratio of unqualified images is greater than a predetermined unqualified image ratio, determining that the image capturing device is in the suspected ineffective state;
after the images are processed to remove noise, based on a determination that an image contrast ratio between a brightest pixel and a darkest pixel in a same image is lower than a predetermined contrast ratio, determining that the image capturing device is in the suspected ineffective state; or
when a same image feature is extracted from multiple acquired images, and when the multiple acquired images are sorted to form an image sequence based on time instances at which the multiple acquired images are captured, based on a determination that a movement trajectory of the same image feature extracted from the image sequence does not match with an estimated motion state provided by the dead reckoning sensor and/or a motion unit, determining that the image capturing device is in the suspected ineffective state.

4. The method of claim 1, wherein
the sensing device includes a distance measuring device, and
obtaining the environmental data acquired by the sensing device includes obtaining distance information acquired by the distance measuring device, the distance information including a distance between the autonomous mobile device and an object in the work environment.

5. The method of claim 4, wherein determining whether the sensing device is in the suspected ineffective state based on the environmental data includes at least one of:
based on a determination that data provided by the dead reckoning sensor indicate that a wheel assembly of the autonomous mobile device is operating normally, and that the distance information acquired by the distance measuring device does not change in a first predetermined time duration, or that a change in the distance information is within a predetermined threshold range, determining that the distance measuring device is in the suspected ineffective state; or
based on a determination that the distance measuring device does not receive a recognizable light within a second predetermined time duration, determining that the distance measuring device is in the suspected ineffective state.

6. The method of claim 1, further comprising:
after determining that the sensing device is in the suspected ineffective state, determining a continuous time duration in which the sensing device is in the suspected ineffective state, and comparing the continuous time duration with a third predetermined time duration; and
based on a determination that the continuous time duration exceeds the third predetermined time duration, and that the difference between the estimated rotation angle and the first predetermined spin angle is greater than the first predetermined threshold value, executing the escape instructions.

7. The method of claim 1, further comprising:
after having moved backwardly for the first predetermined distance, performing step S0: using a current heading direction after having moved backwardly for the first predetermined distance as an initial direction, rotating at the same location in the first rotation direction for a second predetermined spin angle.

8. The method of claim 1, wherein moving along the curve further includes:
using a second predetermined distance as a radius, a predetermined location as a center of a circle, determining a target trajectory circular arc, wherein the predetermined location is located in a zone in front of the stranded location; and
moving along the target trajectory circular arc for a third predetermined distance, or, moving along the target trajectory circular arc for a tangent chord angle that is equal to a second predetermined spin angle.

9. An autonomous mobile device, comprising:
a sensing device configured to acquire environmental data;
an inertial measurement unit configured to acquire one or more motion parameters of the autonomous mobile device;
a motion unit including a wheel assembly configured to drive the autonomous mobile device to move in a work environment; and
a processor configured to execute computer-executable instructions to perform the following functions:
obtaining the environmental data acquired by the sensing device;
determining whether the sensing device is in a suspected ineffective state based on the environmental data, the suspected ineffective state being a state in which the autonomous mobile device is unable to determine whether the autonomous mobile device is in a stranded situation;

based on a determination that the sensing device is in the suspected ineffective state, rotating at a same location for a first predetermined spin angle;

obtaining an estimated rotation angle of the autonomous mobile device based on the one or more motion parameters acquired by the inertial measurement unit;

comparing the estimated rotation angle with the first predetermined spin angle; and based on a determination that a difference between the estimated rotation angle and the first predetermined spin angle is greater than a first predetermined threshold value, executing escape instructions, wherein the escape instructions, when executed by the processor, cause the autonomous mobile device to perform the following operations:

moving backwardly for a first predetermined distance; and moving along a curve to circumvent a location where the processor determines that the sensing device is in the suspected ineffective state, wherein when the escape instructions are executed to cause the autonomous mobile device to move along the curve, the escape instructions cause the autonomous mobile device to perform the following operations:

step S1, controlling the wheel assembly to drive the autonomous mobile device to move forwardly while rotating in a second rotation direction for a first predetermined rotation angle;

step S2, based on a determination that a rotation angle of the autonomous mobile device in the second rotation direction reaches the first predetermined rotation angle, determining a current location of the autonomous mobile device;

step S3, comparing the current location determined in the step S2 with a stranded location where the autonomous mobile device is in the stranded situation, and performing a normal movement based on a determination that at the current location determined in the step S2 the autonomous mobile device circumvents the stranded location, or executing the step S1 or S4 based on a determination that at the current location determined in the step S2 the autonomous mobile device does not circumvent the stranded location;

step S4, controlling the wheel assembly to drive the autonomous mobile device to move forwardly while rotating in a first rotation direction for a second predetermined rotation angle;

step S5, based on a determination that the rotation angle of the autonomous mobile device in the first rotation direction reaches the second predetermined rotation angle, determining a current location of the autonomous mobile device;

step S6, comparing the current location determined in the step S5 with the stranded location, and performing the normal movement based on a determination that at the current location determined in the step S5 the autonomous mobile device circumvents the stranded location; and based on a determination that at the current location determined in the step S5 the autonomous mobile device does not circumvent the stranded location, repeating execution of the steps S1-S3 or the steps S4-S6, until at the current location determined in the step S5 the autonomous mobile device circumvents the stranded location.

10. The autonomous mobile device of claim 9, wherein the sensing device includes an image capturing device, and the processor is configured to execute the computer-executable instructions to obtain images captured by the image capturing device.

11. The autonomous mobile device of claim 9, wherein. the sensing device includes a distance measuring device, and the processor is configured to execute the computer-executable instructions to obtain distance information acquired by the distance measuring device, the distance information including a distance between the autonomous mobile device and an obstacle.

12. The autonomous mobile device of claim 9, wherein after having moved backwardly for the first predetermined distance, the escape instructions also cause the autonomous mobile device to perform the following operation:

step S0, using a current heading direction after having moved backwardly for the first predetermined distance as an initial direction, rotating at the same location in the first rotation direction for a second predetermined spin angle.

13. The autonomous mobile device of claim 9, wherein when the escape instructions cause the autonomous mobile device to move along the curve, the escape instructions also cause the autonomous mobile device to perform the following operations:

using a second predetermined distance as a radius, a predetermined location as a center of a circle, determining a target trajectory circular arc, wherein the predetermined location is located in a zone in front of the stranded location; and moving along the target trajectory circular arc for a third predetermined distance, or, moving along the target trajectory circular arc for a tangent chord angle that is equal to a second predetermined spin angle.

14. The autonomous mobile device of claim 9, wherein the processor is also configured to execute the computer-readable instructions to perform the following functions:

after determining that the sensing device is in the suspected ineffective state, determining a continuous time duration in which the sensing device is in the suspected ineffective state, and comparing the continuous time duration with a third predetermined time duration; and based on a determination that the continuous time duration exceeds the third predetermined time duration, and that the difference between the estimated rotation angle and the first predetermined spin angle is greater than the first predetermined threshold value, executing the escape instructions.

15. A non-transitory computer-readable storage medium storing computer-executable instructions, which when executed by a processor, are configured to cause the processor to perform a method executable by an autonomous mobile device, the method comprising:

moving in a work environment;

obtaining environmental data acquired by a sensing device;

determining whether the sensing device is in a suspected ineffective state based on the environmental data, the suspected ineffective state being a state in which the autonomous mobile device is unable to determine whether the autonomous mobile device is in a stranded situation based on feedback information provided by the sensing device;

based on a determination that the sensing device is in the suspected ineffective state, rotating at a same location for a first predetermined spin angle;

obtaining an estimated rotation angle based on one or more motion parameters acquired by a dead reckoning sensor;

comparing the estimated rotation angle with the first predetermined spin angle; and based on a determination that a difference between the estimated rotation angle and the first predetermined spin angle is greater than a first predetermined threshold value, executing escape instructions, wherein the escape instructions, when executed, cause the autonomous mobile device to perform the following operations:

moving backwardly for a first predetermined distance; and moving along a curve to circumvent a stranded location where the autonomous mobile device determines that the sensing device is in the suspected ineffective state, wherein moving along the curve includes:

step S1, controlling a wheel assembly of the autonomous mobile device to drive the autonomous mobile device to move forwardly while rotating in a second rotation direction for a first predetermined rotation angle;

step S2, based on a determination that a rotation angle of the autonomous mobile device in the second rotation direction reaches the first predetermined rotation angle, determining a current location of the autonomous mobile device;

step S3, comparing the current location determined in the step S2 with the stranded location, and performing a normal movement based on a determination that at the current location determined in the step S2 the autonomous mobile device circumvents the stranded location, or executing the step S1 or S4 based on a determination that at the current location the autonomous mobile device does not circumvent the stranded location;

step S4, controlling the wheel assembly to drive the autonomous mobile device to move forwardly while rotating in a first rotation direction for a second predetermined rotation angle;

step S5, based on a determination that the rotation angle of the autonomous mobile device in the first rotation direction reaches the second predetermined rotation angle, determining a current location of the autonomous mobile device;

step S6, comparing the current location determined in the step S5 with the stranded location, and performing the normal movement based on a determination that at the current location determined in the step S5 the autonomous mobile device circumvents the stranded location; and based on a determination that at the current location determined in the step S5 the autonomous mobile device does not circumvent the stranded location, repeating execution of the steps S1-S3 or the steps S4-S6, until at the current location determined in the step S5 the autonomous mobile device circumvents the stranded location.

16. The non-transitory computer-readable storage medium of claim 15, wherein the method further comprises:

after determining that the sensing device is in the suspected ineffective state, determining a continuous time duration in which the sensing device is in the suspected ineffective state, and comparing the continuous time duration with a third predetermined time duration; and based on a determination that the continuous time duration exceeds the third predetermined time duration, and that the difference between the estimated rotation angle and the first predetermined spin angle is greater than the first predetermined threshold value, executing the escape instructions.

* * * * *